(12) United States Patent
Johnson et al.

(10) Patent No.: US 8,650,735 B2
(45) Date of Patent: Feb. 18, 2014

(54) WHEELCHAIR DOCKING SYSTEM

(75) Inventors: Paul F. Johnson, Knoxville, IL (US); David Charles Adcock, Galesburg, IL (US); Brian Douglas Clark, Ankeny, IA (US); Victor Jon Fageroos, Urbandale, IA (US)

(73) Assignee: Transfer Solutions, LLC, Galesburg, IL (US)

( * ) Notice: Subject to any disclaimer, the term of this patent is extended or adjusted under 35 U.S.C. 154(b) by 399 days.

(21) Appl. No.: 12/976,798

(22) Filed: Dec. 22, 2010

(65) Prior Publication Data

US 2012/0159768 A1 Jun. 28, 2012

(51) Int. Cl.
*B21D 39/03* (2006.01)
(52) U.S. Cl.
USPC .......................... 29/428; 280/304.1
(58) Field of Classification Search
USPC .......................... 280/304.1; 29/428
See application file for complete search history.

(56) References Cited

U.S. PATENT DOCUMENTS

| | | | |
|---|---|---|---|
| 1,635,575 A | 7/1927 | Cole | |
| 3,955,847 A | 5/1976 | Schiowitz | |
| 4,019,752 A | 4/1977 | Leon et al. | |
| 4,060,271 A | 11/1977 | Williams et al. | |
| 4,076,268 A | 2/1978 | Hart | |
| 4,093,303 A | 6/1978 | Nelson | |
| 4,113,270 A * | 9/1978 | Barecki ............................. | 280/1 |
| 4,221,396 A * | 9/1980 | Kehl .................................. | 280/1 |
| 4,257,644 A | 3/1981 | Stephens | |
| 4,265,478 A | 5/1981 | Korsgaard | |
| 4,427,210 A | 1/1984 | Wevers | |
| 4,457,551 A | 7/1984 | Anthony | |
| 4,475,762 A | 10/1984 | DeLong et al. | |

(Continued)

FOREIGN PATENT DOCUMENTS

| | | |
|---|---|---|
| CA | 1084777 | 9/1980 |
| CA | 1086140 | 9/1980 |

(Continued)

OTHER PUBLICATIONS

"Access Marine Design and Fabrication Wheelchair Stabilizer", Access Marine Design and Fabrication, Inc., http://web.archive.org/web.20070706190143/http://www.accessmarine.org/ Printed from Internet Jul. 6, 2010, 7 pages, first on web site Nov. 30, 2004.

(Continued)

*Primary Examiner* — Carl Arbes
(74) *Attorney, Agent, or Firm* — McKee, Voorhees & Sease, P.L.C.

(57) ABSTRACT

A wheelchair docking system is provided to prevent accidental movement of a wheelchair away from a transfer object, such as a bed or toilet, while a person is transferring between the wheelchair and the object. The system includes a latch assembly and a post assembly, one of each which is mounted on the wheelchair and on the transfer object. The latch assembly is moveable between an open position to receive and release the post assembly and a closed position to retain the post assembly. The latch assembly is biased to the closed position. A lock is provided in the latch assembly to hold the latch assembly in the open position. In an alternative embodiment, the post assembly has interchangeable parts for mounting on different objects, and a clamp which is opened and closed by a dual-function pivotal post member.

24 Claims, 25 Drawing Sheets

(56) References Cited

U.S. PATENT DOCUMENTS

| | | | |
|---|---|---|---|
| 4,492,403 A | 1/1985 | Blomgren et al. |
| 4,511,171 A | 4/1985 | Petersen |
| 4,588,340 A | 5/1986 | Howard |
| 4,671,713 A | 6/1987 | Lenkman |
| 4,688,843 A | 8/1987 | Hall |
| 4,690,364 A | 9/1987 | Constantin |
| 4,730,964 A | 3/1988 | Joyner |
| 4,826,193 A | 5/1989 | Davis |
| 4,886,403 A | 12/1989 | Gresham |
| 4,971,341 A | 11/1990 | Magnuson |
| 4,973,022 A | 11/1990 | Mayland |
| 4,995,775 A | 2/1991 | Gresham |
| 5,052,647 A | 10/1991 | Axelson et al. |
| 5,074,507 A | 12/1991 | Axelson et al. |
| 5,127,113 A | 7/1992 | Di Matteo et al. |
| 5,344,265 A | 9/1994 | Ullman et al. |
| 5,388,937 A | 2/1995 | Farsai |
| 5,391,030 A | 2/1995 | Lee |
| 5,509,680 A | 4/1996 | Scharf et al. |
| 5,628,595 A | 5/1997 | Harris |
| 5,888,038 A | 3/1999 | Ditch et al. |
| 6,287,060 B1 | 9/2001 | Girardin |
| 6,428,254 B2 | 8/2002 | Craft |
| 6,471,454 B1 | 10/2002 | Koller |
| 6,474,916 B2 | 11/2002 | Constantin |
| 6,607,470 B2 | 8/2003 | Catanescu et al. |
| 6,685,403 B2 | 2/2004 | Constantin |
| 6,702,313 B2 | 3/2004 | Forshee et al. |
| 6,872,037 B2 | 3/2005 | Girardin |
| 6,918,722 B1 | 7/2005 | Girardin |
| 7,040,847 B1 | 5/2006 | Cardona |
| 7,104,740 B2 | 9/2006 | Girardin |
| 7,108,466 B2 | 9/2006 | Panzarella et al. |
| 7,229,238 B2 | 6/2007 | Girardin et al. |
| 7,296,960 B2 | 11/2007 | Strong |
| D573,875 S | 7/2008 | Anderson |
| 7,431,546 B2 | 10/2008 | Panzarella et al. |
| 7,452,170 B2 | 11/2008 | Girardin |
| 7,510,345 B2 | 3/2009 | Kosh et al. |
| 7,637,705 B2 | 12/2009 | Girardin et al. |
| 7,686,562 B2 | 3/2010 | Panzarella et al. |
| 7,717,655 B2 | 5/2010 | Cardona |
| 7,736,104 B2 | 6/2010 | Hobson |
| 7,753,630 B2 | 7/2010 | Jeppsson |
| 2004/0000440 A1 | 1/2004 | Sawyer |
| 2006/0249617 A1 | 11/2006 | Cardona |
| 2008/0079252 A1 | 4/2008 | Shutter et al. |
| 2009/0016836 A1 | 1/2009 | Girardin et al. |
| 2009/0078811 A1 | 3/2009 | Dick et al. |
| 2009/0087278 A1 | 4/2009 | Girardin et al. |
| 2009/0309344 A1 | 12/2009 | van Roosmalen et al. |
| 2010/0086375 A1 | 4/2010 | Tremblay et al. |
| 2010/0171284 A1* | 7/2010 | Parks et al. ................ 280/304.1 |

FOREIGN PATENT DOCUMENTS

| | | |
|---|---|---|
| CA | 1134207 | 10/1982 |
| CA | 1160907 | 1/1984 |
| CA | 2077879 | 7/1997 |
| CA | 2248472 | 3/1999 |
| CA | 2427531 | 5/2002 |
| CA | 2570910 | 6/2008 |
| DE | 3636492 C2 | 4/1988 |
| EP | 1 638 821 A | 3/2006 |
| EP | 1837003 B1 | 1/2010 |
| FR | 2740410 | 4/1997 |
| GB | 2328917 A | 3/1999 |
| GB | 2430466 A | 3/2007 |
| GB | 2442186 A | 3/2008 |
| GB | 2435193 B | 10/2008 |
| GB | 2453028 A | 3/2009 |
| JP | 8244619 | 9/1996 |
| WO | 2005102775 A1 | 11/2005 |
| WO | 2008039810 A3 | 4/2008 |
| WO | 2009009726 A1 | 1/2009 |
| WO | 2009029773 A2 | 3/2009 |
| WO | 2010040138 A2 | 4/2010 |

OTHER PUBLICATIONS

MobilityWorks, "EZ Lock Wheelchair Docking Systems", http://www.mobilityworks.com/ezlock.php, printed Internet on Jul. 6, 2010, 2 pages.

Cook Technoloies, Inc., PCT/US2011/064530 filed on Dec. 13, 2011, "Internation Search Report", mail date Jul. 31, 2012.

* cited by examiner

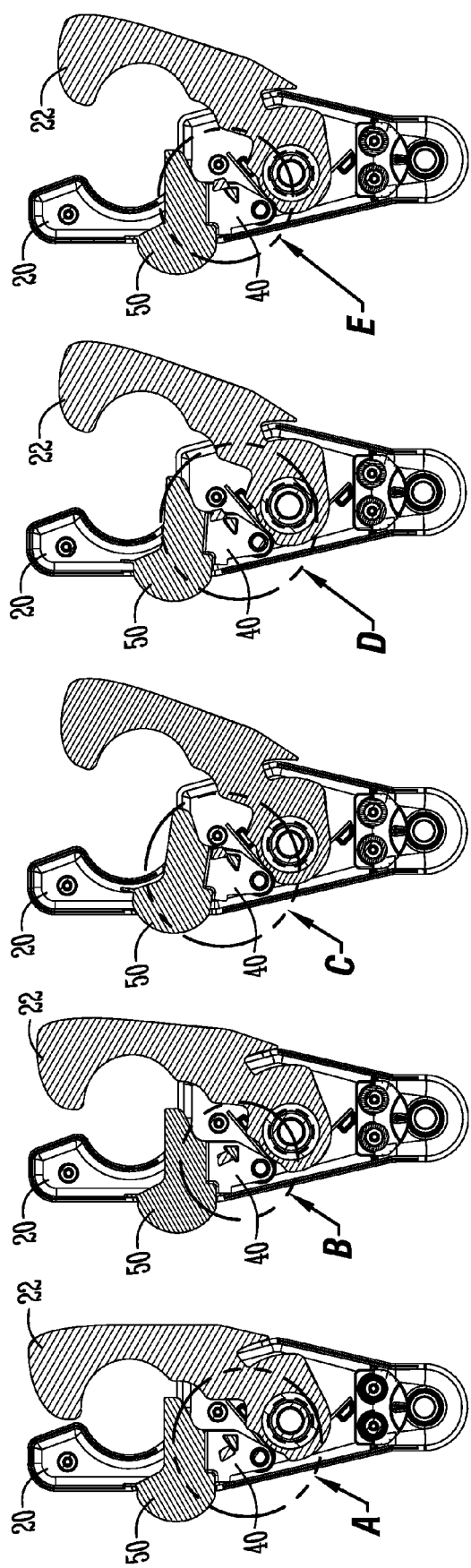

WHEELCHAIR DOCKING SYSTEM

BACKGROUND OF THE INVENTION

Wheelchair occupants are normally moved at least several times a day between the wheelchair and a transfer object, such as a bed, chair, toilet, or other fixed structure. One common problem which unfortunately occurs during such transfers is accidental falls due to movement of the wheelchair during the transfer process. These falls may arise when a wheelchair occupant is moving himself or herself to or from the transfer object, or when another person is assisting in the transfer. These falls may cause injuries to the occupant which, of course, is undesirable.

The US Patent Application in the name of Parks, Publication No. 2010/0171284, published on Jul. 8, 2010, includes a background which describes in detail accidental falls when a person is being transferred to or from the wheelchair. The Parks' Application discloses a wheelchair stabilizing device, which eliminates or minimizes the risk of falls during transfer of a person to and from a wheelchair.

A primary objective of the present invention is to provide a wheelchair docking system which is an improvement on the Parks' wheelchair stabilizing device.

Another objective of the present invention is the provision of a wheelchair docking system for docking or coupling a wheelchair to an object, such as a bed, a toilet, furniture, or a wall, while a person is being moved to or from the wheelchair.

Still another objective of the present invention is the provision of a wheelchair docking system which minimizes or eliminates the risk of falls when a person is being transferred to or from the wheelchair.

Another objective of the present invention is the provision of a wheelchair docking system having a latch which can be locked open for quick and easy disengagement from a restraint post.

Another objective of the present invention is the provision of an improved wheelchair docking system having an easily controlled finger grip for pulling the latch to an open position.

Another objective of the present invention is the provision of an improved wheelchair docking system which can secure the wheelchair to a bed, a chair, a toilet, a wall, or other fixed object.

Yet another objective of the present invention is the provision of an improved wheelchair docking system which is lightweight, yet durable and safe in use.

Another objective of the present invention is the provision of a wheelchair docking device which quickly and easily couples and uncouples the wheelchair to a substantially fixed object, such as a bed, toilet, chair, or wall.

A further objective of the present invention is the provision of a wheelchair docking system having alternative mounting brackets to provide versatility of the system.

Yet another objective of the present invention is the provision of a wheelchair docking system which is economical to manufacture.

These and other objectives become apparent from the following description of the invention.

SUMMARY OF THE INVENTION

The wheelchair docking system of the present invention is used to couple a wheelchair to an object to or from which the wheelchair occupant is being transferred, such as a bed, a toilet, a piece of furniture, or to a fixed object, such as a wall, so as to prevent the wheelchair from rolling away from the object. The docking system includes a latch assembly and a post assembly, which are interchangeably mountable on the wheelchair and the transfer object, such as a bed, toilet, chair or couch. The latch assembly includes a pair of first and second arms, with at least one arm being pivotal relative to the other arm, such that the latch assembly is moveable between open and closed positions. The latch assembly and the post assembly each include a mounting bracket, which may take various forms or shapes, for attachment to the wheelchair leg, the bed frame, the toilet bowl, or other portions of the transfer object or wheelchair. In the preferred embodiment, the mounting bracket has a clamp to engage and disengage the object, such as a bed frame or the toilet bowl rim. The post assembly also includes an upright post member, which is releasably received and retained between the latch arms so as to dock the wheelchair to the object. In one embodiment, the post member also functions as a lever to actuate and de-actuate the clamp.

The latch assembly is normally biased to a closed position. When the wheelchair is moved toward the transfer object, the post member forces the latch assembly to temporarily open so as to receive the post member between the latch arms, which then automatically close so as to retain the post member, and thereby preclude the wheelchair from accidentally rolling away from the transfer object. When it is time to move the wheelchair away from the transfer object, the latch assembly can be manually opened by pulling a finger grip wing tab on the first latch arm. Alternatively, a lock mechanism on the latch assembly can be actuated so as to lock the latch assembly in an open position. When the latch assembly is opened, the post member is free to disengage from the latch arms as the wheelchair is moved away from the transfer object. If the lock mechanism is actuated so the latch assembly is open when the wheelchair is moved toward the transfer object, the post member will engage the lock mechanism to deactivate the lock and allow the latch assembly to close for retention of the post member.

BRIEF DESCRIPTION OF THE DRAWINGS

FIGS. 13A-E are sectional views of the latch assembly, showing the operation of the lock mechanism in a sequence from a closed latch position to an open latch position.

FIGS. 14A-E are enlargements taken from FIGS. 13A-E, respectively, to show the interaction between the lock tab and the finger of the second latch arm.

DETAILED DESCRIPTION OF THE PREFERRED EMBODIMENTS

Figure 1A:
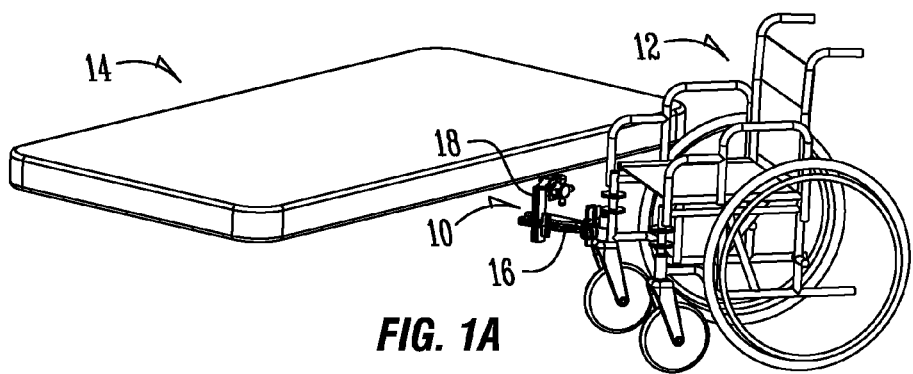
FIGS. 1A, 1B and 1C are perspective views of a wheelchair secured to a bed using the wheelchair docking system of the present invention.
Figure 1B:
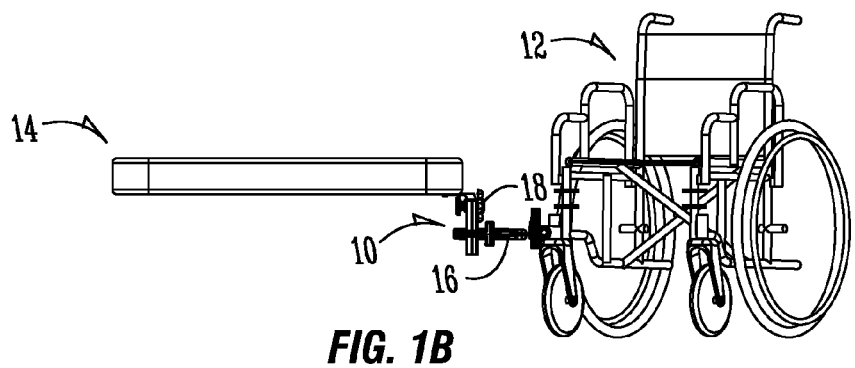
Figure 1C:
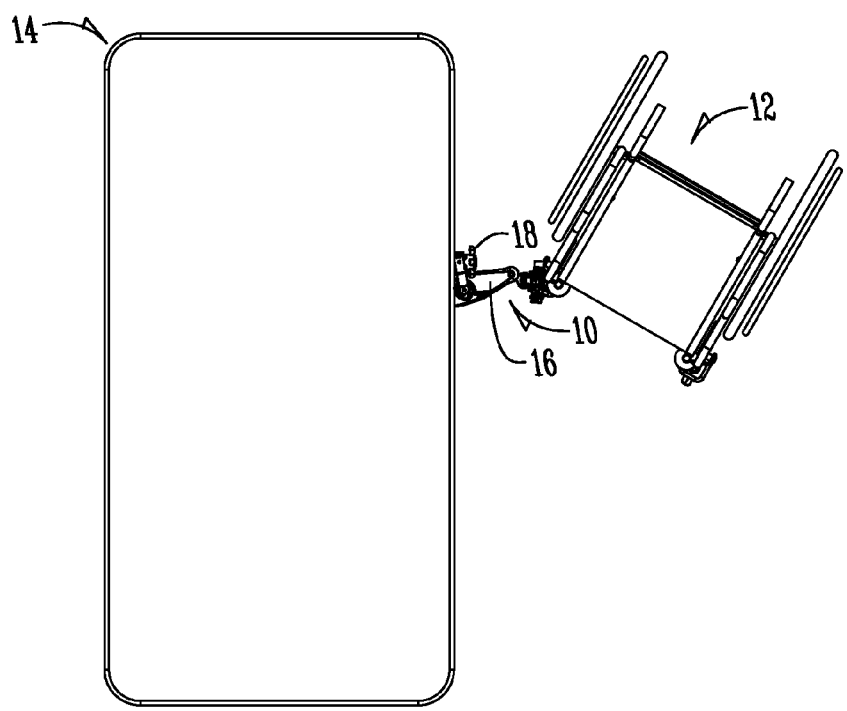
Figure 2A:
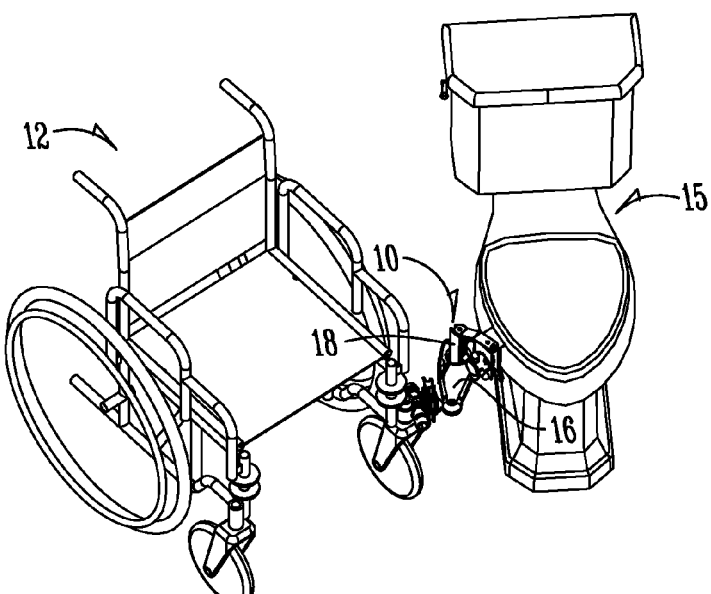
FIGS. 2A, 2B and 2C are perspective views of a wheelchair secured to a toilet using the wheelchair docking system of the present invention.
Figure 2B:
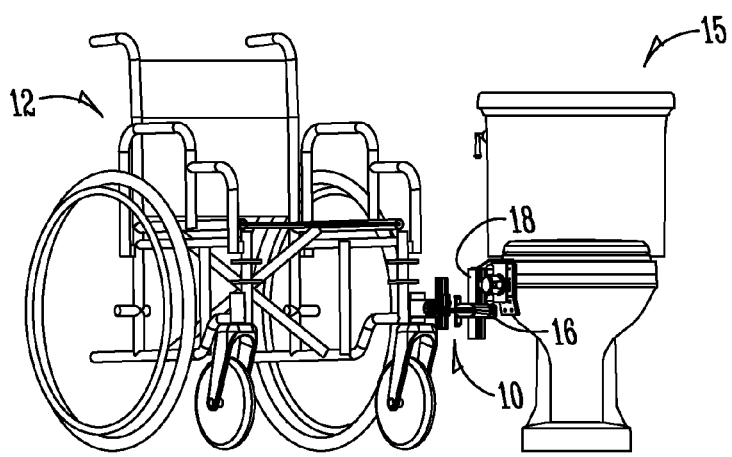
Figure 2C:
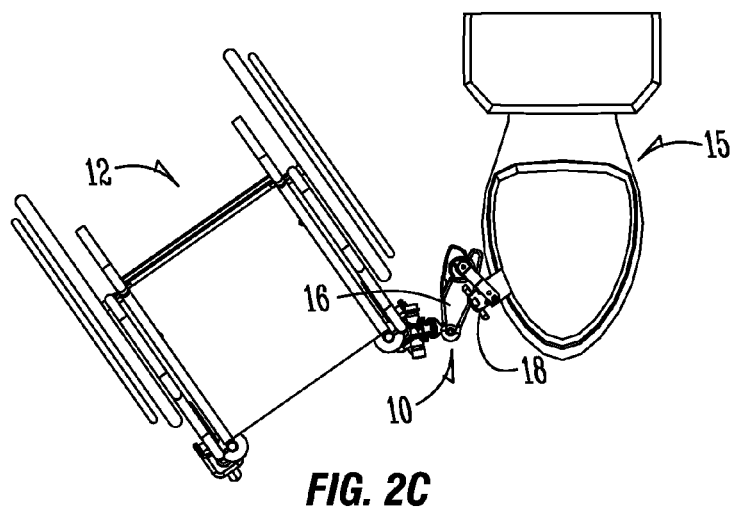
Figure 3:
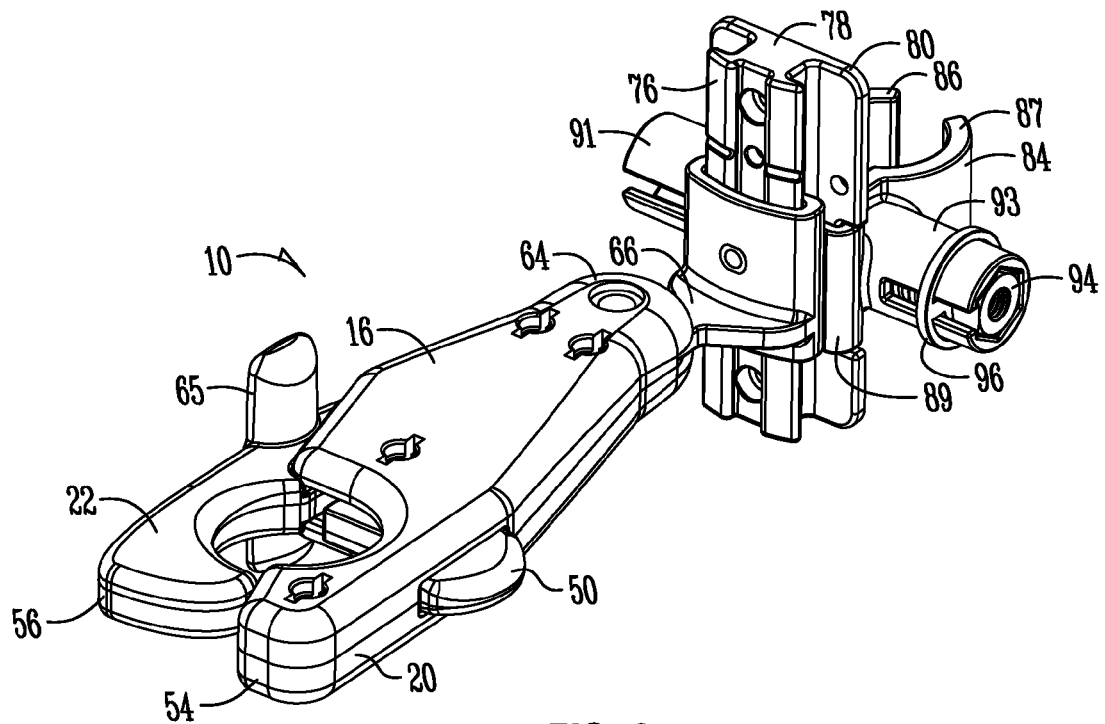
FIG. 3 is a perspective view of the wheelchair docking system showing a latch assembly in the closed position and a wheelchair mounting bracket.
Figure 4:
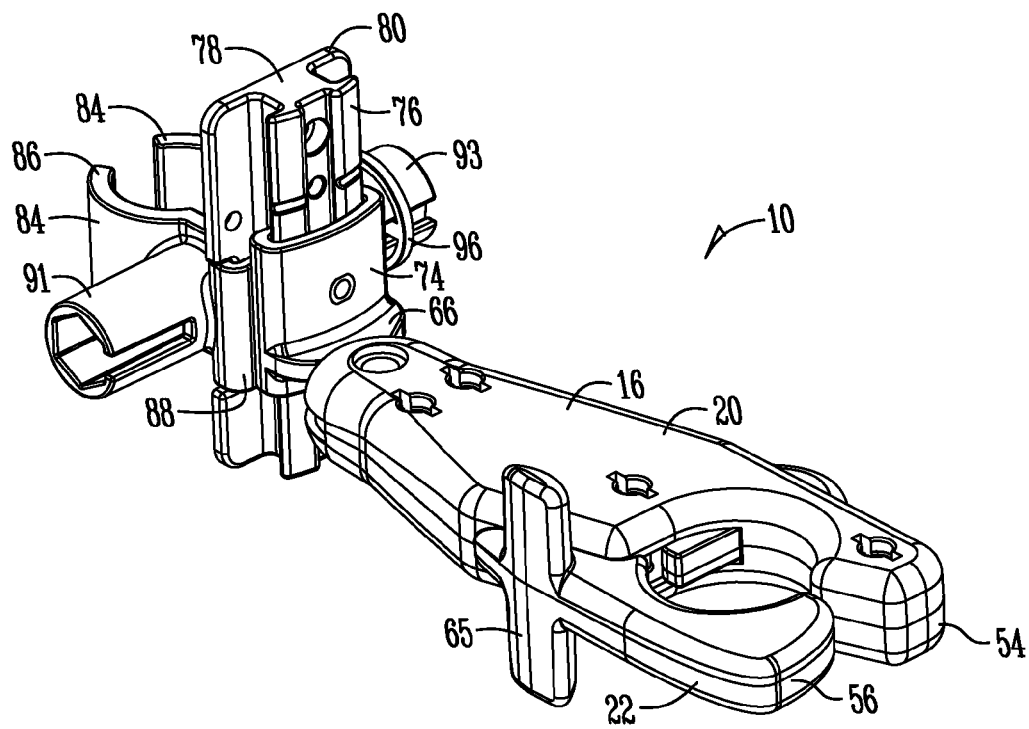
FIG. 4 is another perspective view of the system shown in FIG. 3.

The wheelchair docking system 10 of the present invention is used to secure or connect a wheelchair 12 to a transfer object, such as a bed 14, as shown in FIGS. 1A-C, or a toilet 15, as shown in FIGS. 2A-C, so as to preclude the wheelchair 12 from moving away from the transfer object when a person is being transferred between the wheelchair 12 and the transfer object. The system can also be used to secure the wheelchair to other fixed objects, such as a wall. The docking system 10 generally includes two primary components, the latch assembly 16 and the post assembly 18. The latch assembly 16 and post assembly 18 are reversible, so that either one may be on the wheelchair or on the transfer or fixed object. It is understood that the system 10 may be attached to either side of the wheelchair 12.

The latch assembly 16 includes a first arm 20 and a second arm 22 pivotally connected to the first arm 20 for movement between open and closed positions. The first arm 20 is formed from upper and lower housings or shells 24, 26, which are secured together in any convenient manner, such as screws (not shown). The second arm 22 is formed as one piece, and is sandwiched between the shells 24, 26. The second arm 22 has an inner pivot end 28 mounted between pivot bosses 30 formed on the inside of the shells 24, 26. Upper and lower bushings 32 reside between the inner end 28 and bosses 30 to minimize friction, while a sleeve 34 extends through the bushings 32, and the opening in the inner end 28, and into one of the bosses 30 to provide controlled pivotal movement of the second arm 22 relative to the first arm 20. A torsion spring 36 biases the second arm 22 to the closed position.

The latch assembly 16 also includes a lock mechanism 40 residing between the shells 24, 26 of the first arm 20. The lock mechanism 40 is pivotally mounted on a second pivot boss 42 so as to be moveable between a locked position and an unlocked position. A second torsion spring 44 biases the lock mechanism to the unlocked position. The lock mechanism 40 cooperates with the second arm 22, such that when the lock mechanism 40 is activated or moved to the locked position, the second arm 22 is held in the open position.

More particularly, a flange or tab 46 on the lower surface of the lock mechanism 40 engages a finger 48 on the second arm 22 to maintain the second arm 22 in the open position, against the bias of the torsion springs 36 and 44. The lock mechanism 40 can be easily engaged to the locked position by simply depressing a thumb button 50 which extends outwardly beyond the shells 24, 26 of the first arm 20, until the tab 46 moves past the finger 48 and thereby locks the finger 48 behind the tab 46. The spring 44 then urges the button 50 back to its initial position, while the arm 22 is held open by the lock mechanism 40. FIGS. 13A-E and 14A-E show, in sequence, the relative positions of the lock tab 46 and the finger 48 as the lock button 50 is depressed and then released. A release tab 52 on the lock mechanism 40 can be depressed to pivot the mechanism about the boss 42, so that the tab 46 drops below the finger 48, thereby disengaging the tab 46 from the finger 48, such that the second arm 22 automatically pivots to the closed position due to the bias of the spring 36.

Figure 5:
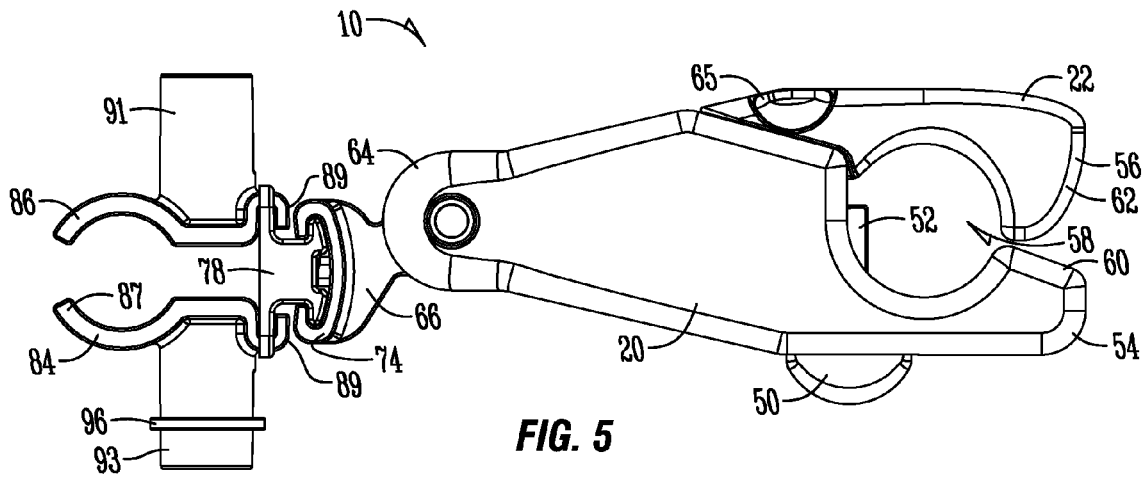
FIG. 5 is a top plan view of the system shown in FIG. 3.
Figure 6:
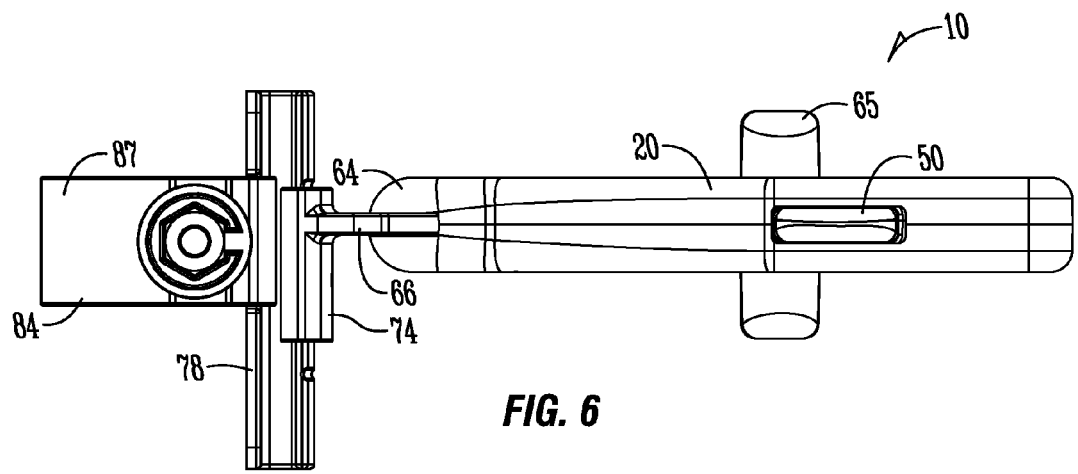
FIG. 6 is a side elevation view of the system shown in FIG. 3.
Figure 7:
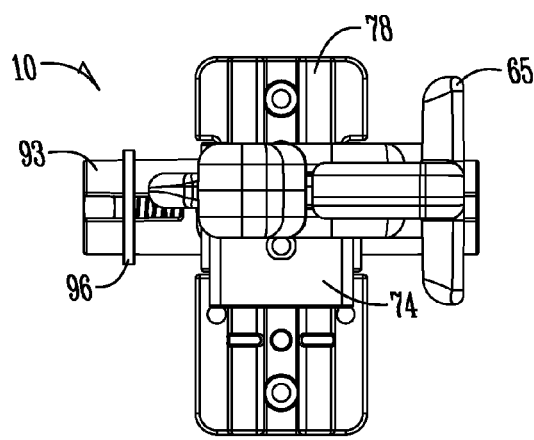
FIG. 7 is a front elevation view of the system shown in FIG. 3.
Figure 8:
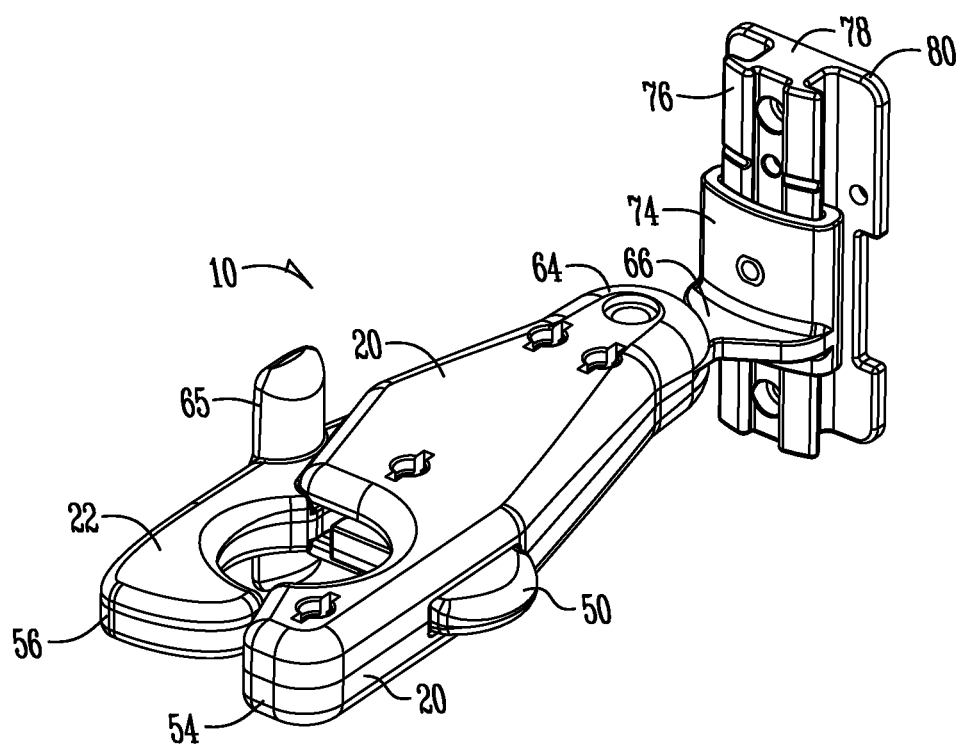
FIG. 8 is a perspective view of an alternative wheelchair docking system having a latch assembly and a wall mounting bracket.
Figure 9:
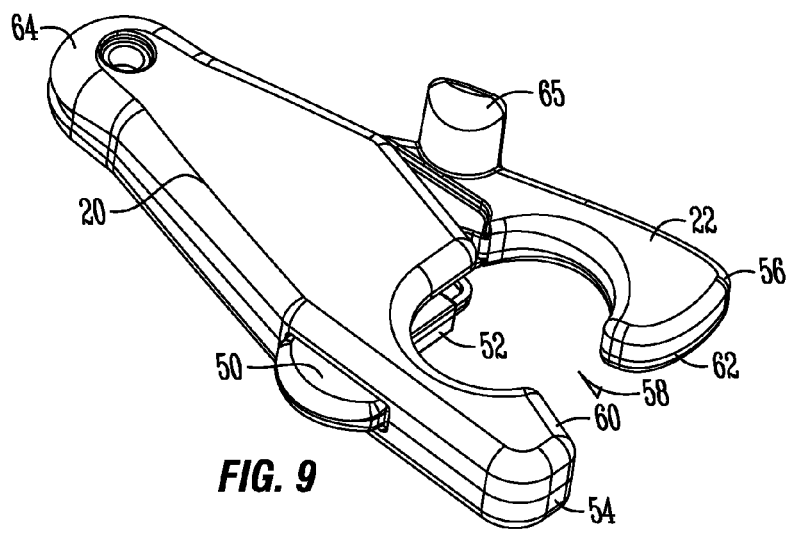
FIG. 9 is a perspective view of the latch assembly in an open position.
Figure 10:
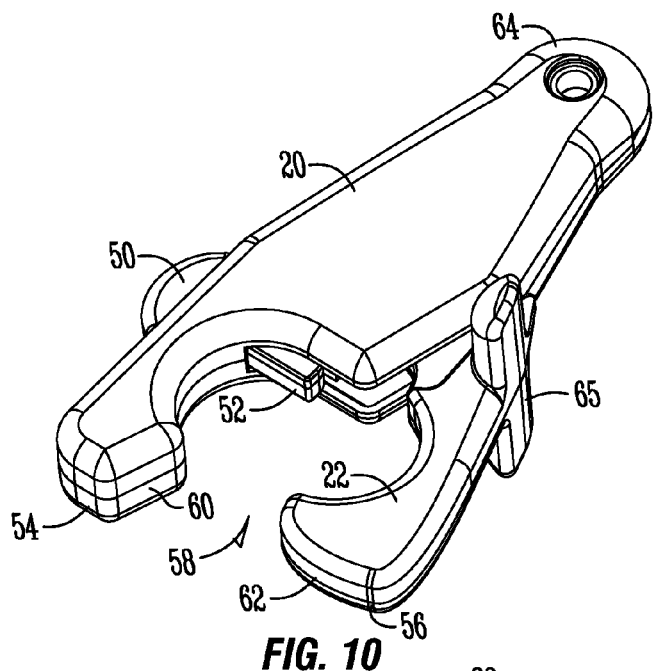
FIG. 10 is another perspective view of the latch assembly in an open position.
Figure 11:
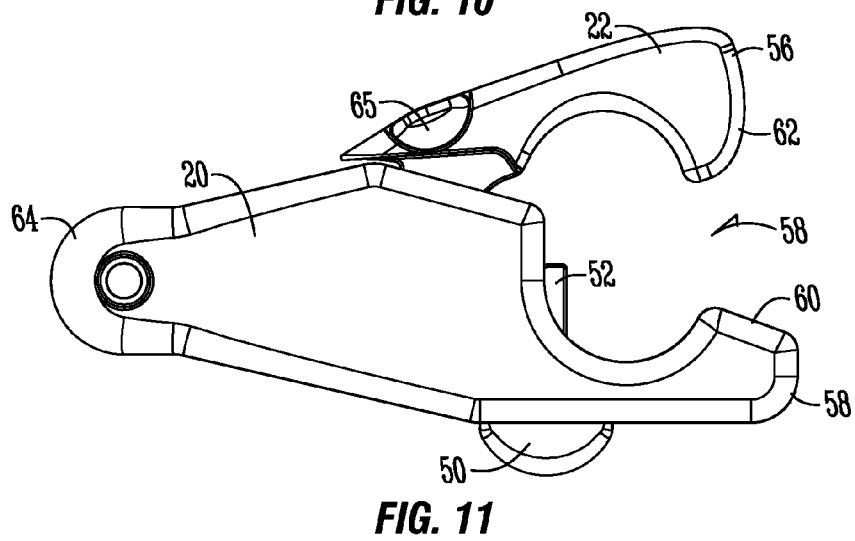
FIG. 11 is a top plan view of the latch assembly in an open position.
Figure 12A:
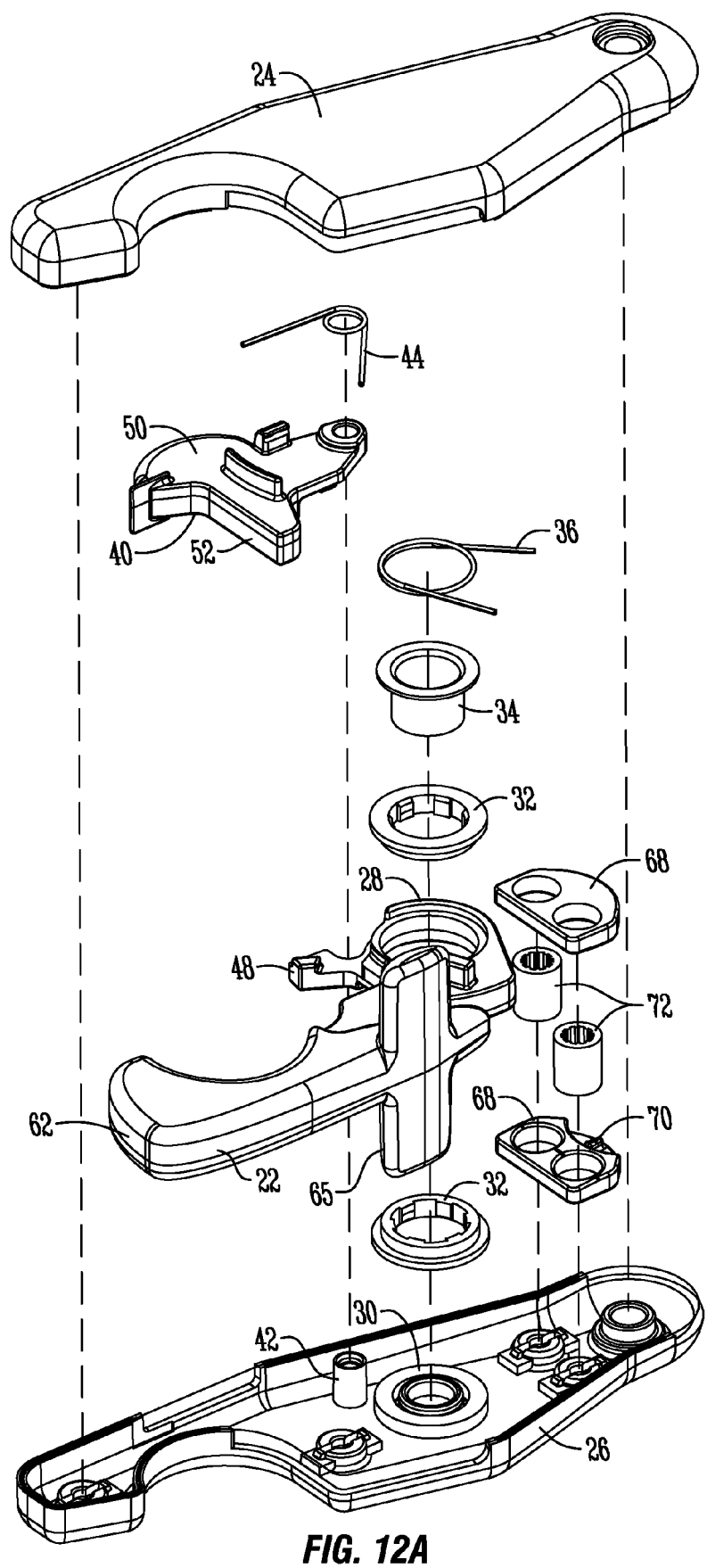
FIG. 12A is an exploded view of the latch assembly from an upper perspective.
Figure 12B:
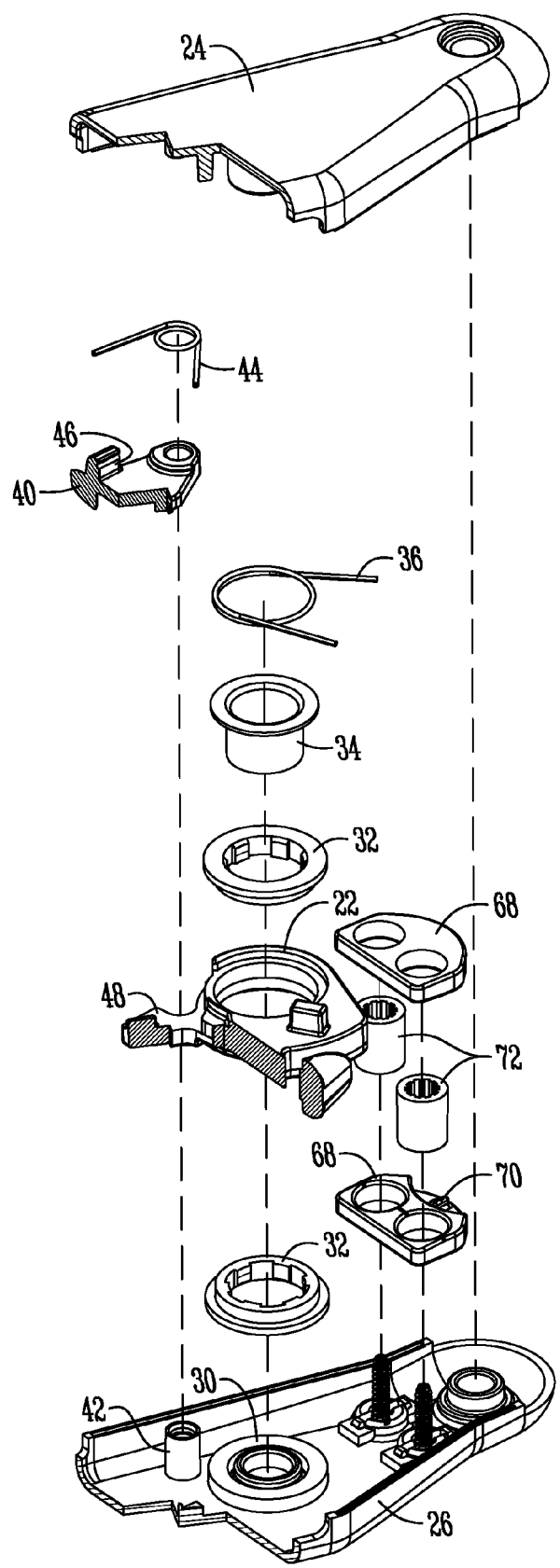
FIG. 12B is a cut-away exploded view of the latch assembly from a lower perspective.
Figure 12C:
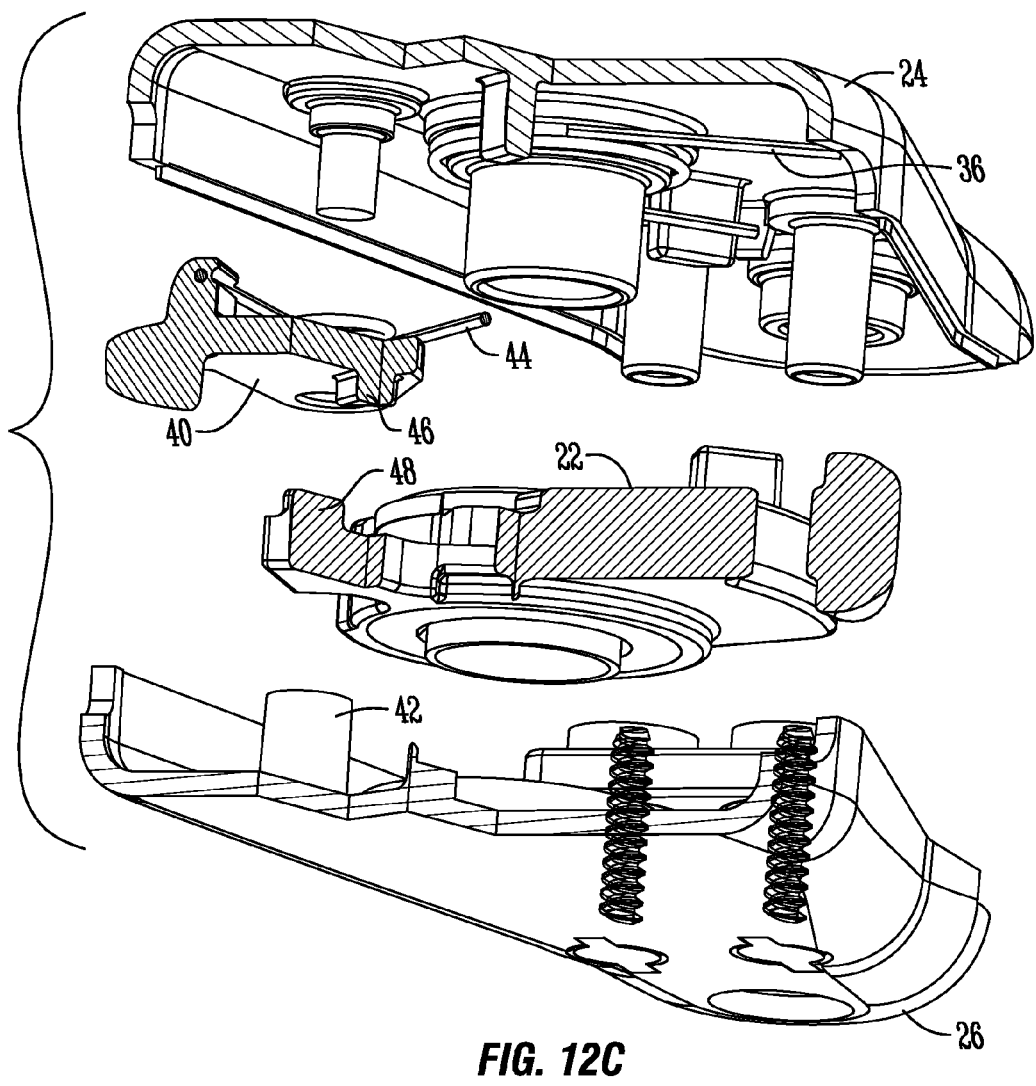
FIG. 12C is an enlarged exploded view showing the lock mechanism of the latch assembly.
Figure 12D:
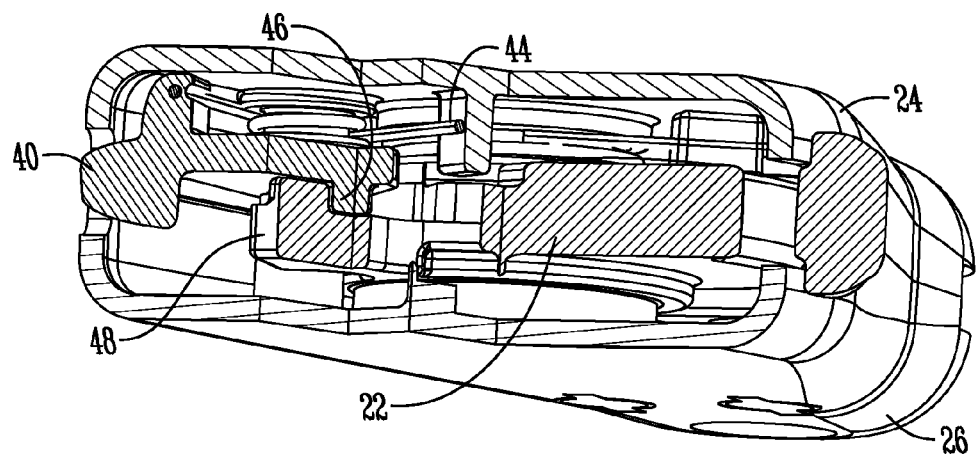
FIG. 12D is a sectional view of the lock mechanism for the assembled latch assembly.

The first arm 20 and the second arm 22 each have a distal end in the form of a hook 54, 56, respectively. The hooks 54, 56 form an opening or receptacle 58 for receiving the post assembly 18, as described in further detail below. As best seen in FIG. 5, the forward distal ends of the hooks 54, 56 have curved or sloped surfaces 60, 62 which converge toward the opening 58, so that when a force is applied toward the proximal end 64 of the latch assembly 16 by the post assembly 18, the second arm 22 is automatically and temporarily pivoted to the open position with the hook 56 spaced apart from the hook 54 so as to receive the post assembly 18. The torsion spring 36 then biases the second arm 22 to the closed position after the post assembly is received in the opening 58.

To release the post assembly 18 from the latch assembly 16, the lock mechanism 40 may be actuated to hold the second arm 22 open, so that the wheelchair 12 can be rolled away from the transfer object 14. As an alternative to actuating the lock mechanism, a person in the wheelchair 12, or an assistant, can pull on the wings or fingers 65 on the second arm 22 so as to open the latch assembly 16 to allow the wheelchair to be backed away from the post assembly 18.

The inner or proximal end 64 of the first arm 20 is adapted to be connected to a swing arm 66 using a screw, bolt or other fastener (not shown). The end of the swing arm 66 residing within the first arm 20 includes a plurality of teeth or notches 71 on the upper and lower surfaces. Also mounted within the inner end of the first arm 20 are a pair of upper and lower indexing plates 68 each of which have a tooth 70 adapted to selectively engage one of the corresponding notches 71 on the opposite sides of the swing arm 66. The plates 68 are separated by rubber or compressible bushings 72. The bushings 72 are slightly compressed when the shells 24, 26 are fastened together. Thus, the first arm 20 is pivotally connected to the swing arm 66, and retained in a selective angular position by the engagement of the teeth 70 of the indexing plates 68 with the notches 71 of the swing arm 66.

The swing arm 66 has a C-shaped collar 74 adapted to receive a T-shaped head 76 of a mounting bracket 78. The collar 74 of the swing arm 66 is slidable along the T-head 76 of the mounting bracket 78, and is held in a selected position by a set screw 79. The mounting bracket 78 includes a base 80 with screw holes 82 so that the bracket 78 can be secured to a wall, furniture, or other structure, to which the wheelchair could be latched, if desired.

Figure 15:
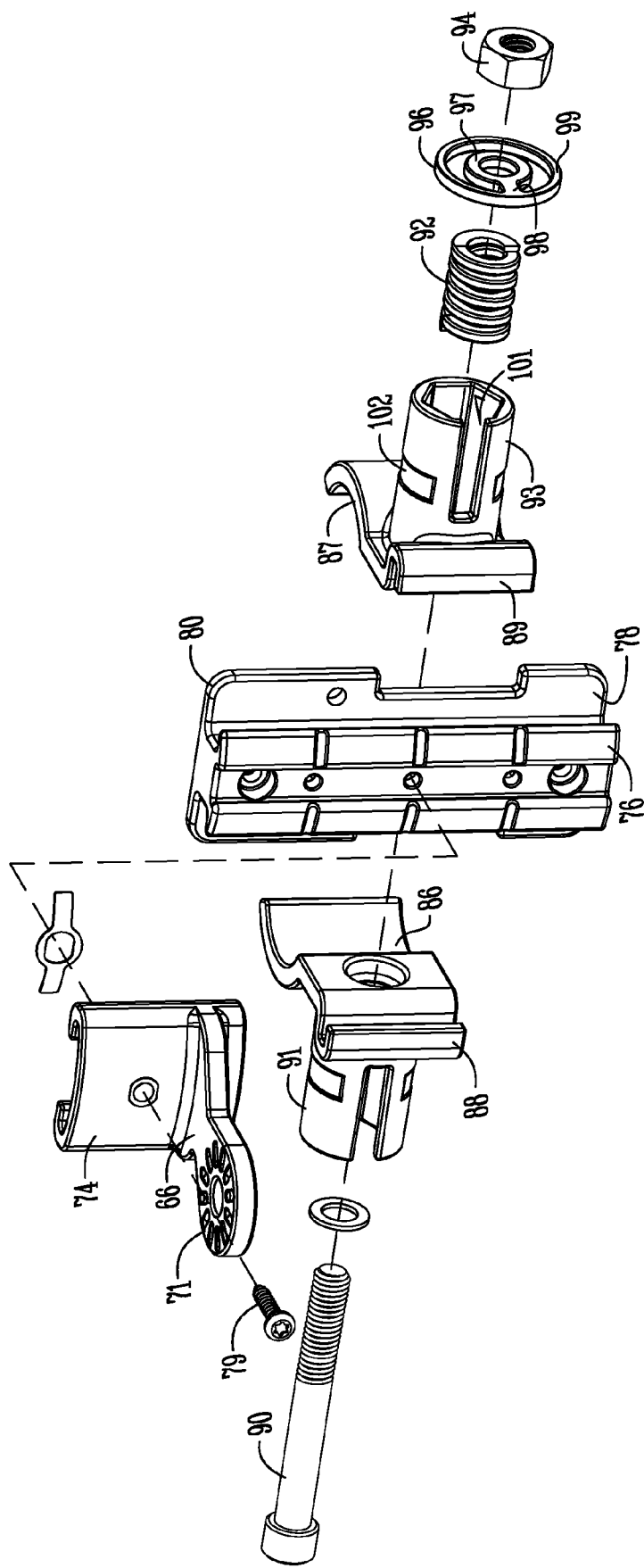
FIG. 15 is an exploded view of a preferred embodiment of the wheelchair mounting bracket according to the present invention.
Figure 16:
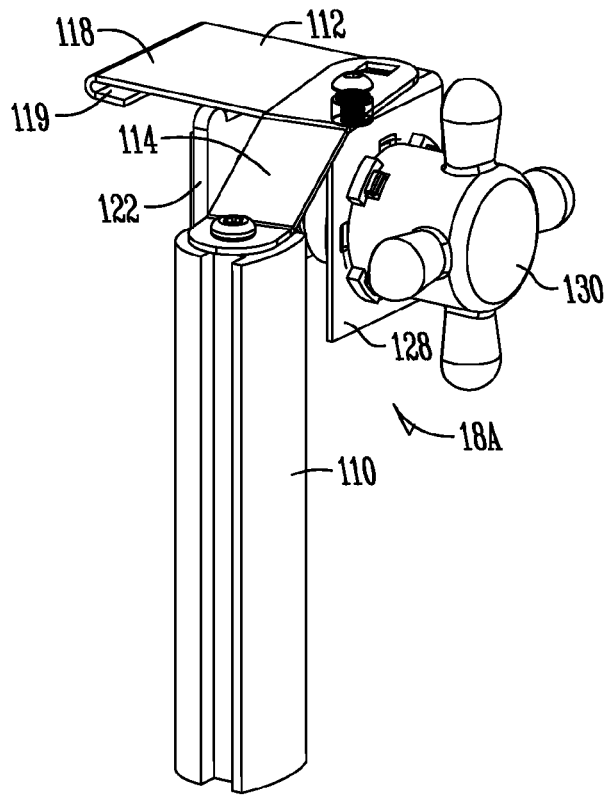
FIG. 16 is a perspective view of a bed frame mounting bracket, which is one form of the post assembly of the wheelchair docking system according to the present invention.
Figure 17:
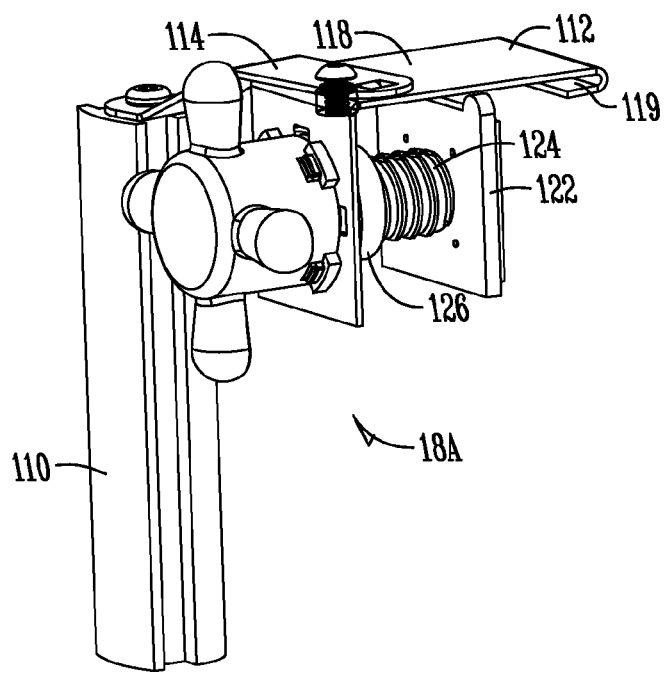
FIG. 17 is another perspective view of the bed frame mounting bracket.
Figure 18:
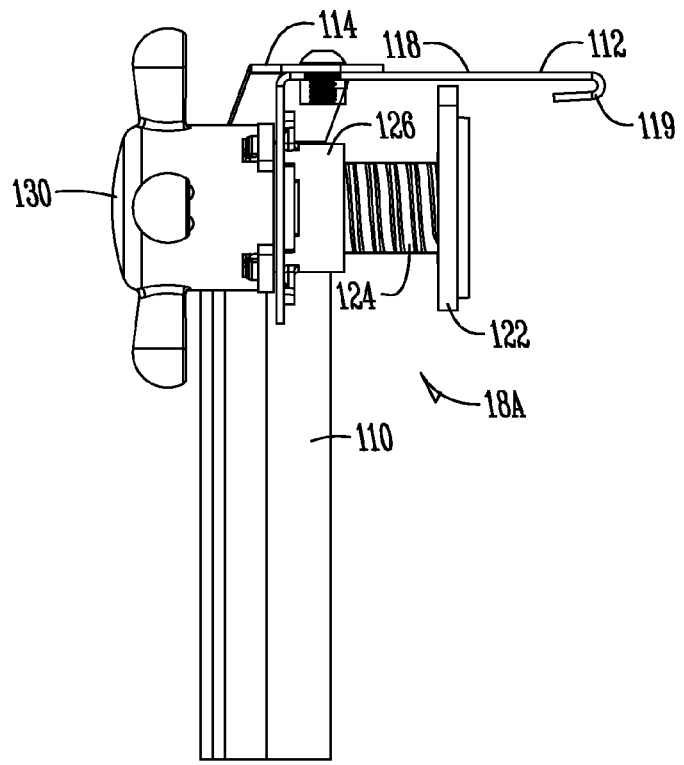
FIG. 18 is a side elevation view of the bed frame mounting bracket.
Figure 19:
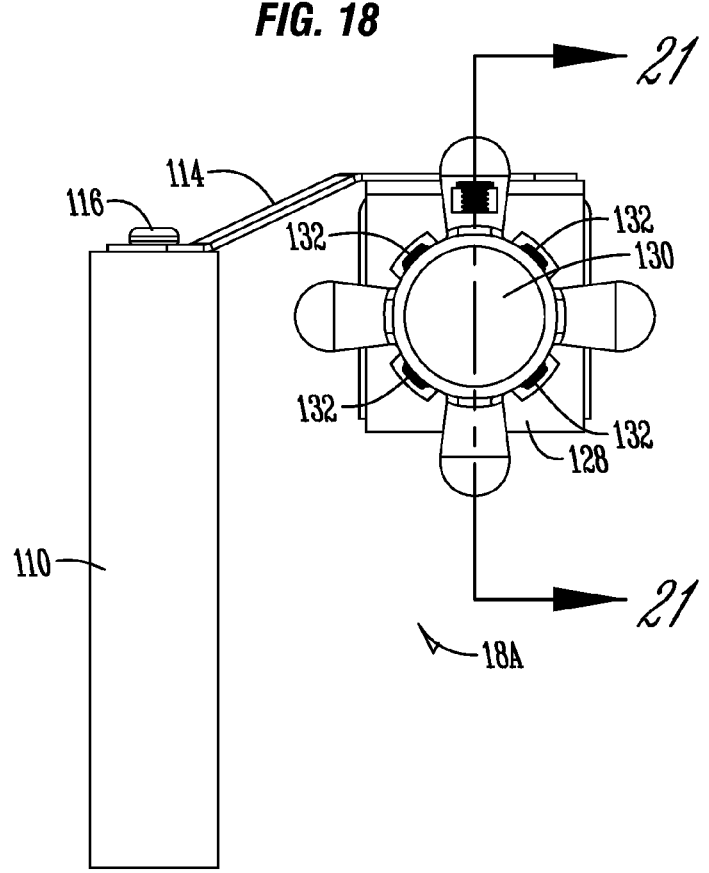
FIG. 19 is a front elevation view of the bed frame mounting bracket.
Figure 20:
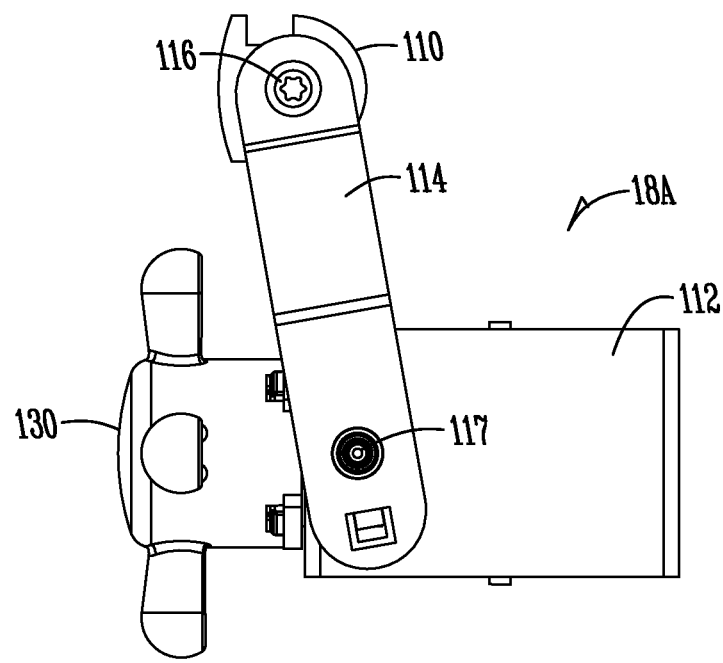
FIG. 20 is a top plan view of the bed frame mounting bracket.
Figure 21:
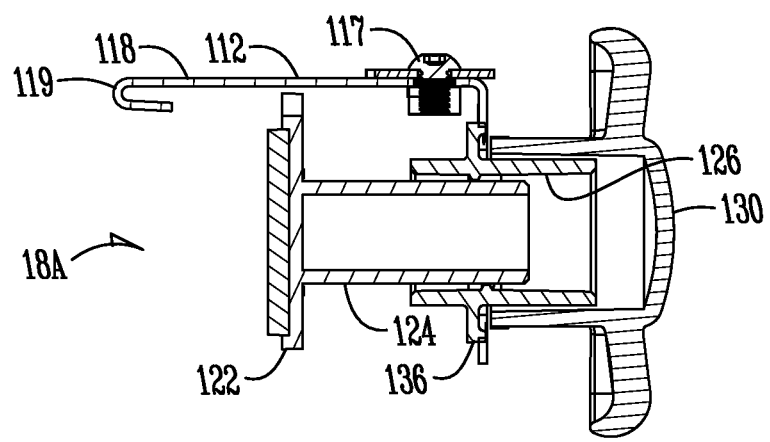
FIG. 21 is a sectional view of the bed frame mounting bracket taken along the lines 21-21 of FIG. 19.

In the preferred embodiment, the latch assembly 16 includes a clamp 84 for mounting the latch assembly 16 to a wheelchair 12. As best seen in FIG. 5, the clamp has a pair of arms 86, 87 which can be opened and closed so as to receive a portion of the wheelchair frame, such as the leg. The clamp 84 also has a pair of clamp arms 89, 91 opposite the arms 86, 87. The clamp arms 88, 89 are adapted to be secured to the base 80 of the mounting bracket 78, as best seen in FIG. 5. The clamp 84 has transverse sleeves 91, 93 extending opposite one another, as best seen in the exploded view of FIG. 15. An elongated bolt 90 is adapted to extend through the sleeve 91 and through a tension spring 92 in the sleeve 93. A nut 94 in the sleeve 93 is threaded onto the end of the bolt 90. The sleeve 93 has a hex shape so that the nut 94 will not turn within the sleeve. The head of the bolt 90 has a recess for receiving an allen wrench for tightening and loosening the bolt 90, and thereby loosening or tightening the clamp arms 86, 87, 88, 89. A tension indicator 96 may be mounted on the bolt 90 between the spring 92 and the nut 94 so as to provide a visual indication of the tension level. The indication 96 has an inner ring 97 for receiving the bolt 90, and an outer ring 99 extending around the sleeve 93, with a connecting web extending through an axial slot 101 in the sleeve 93, such that the indicator 96 slides axially along the sleeve 93 as the bolt 90 is turned. A marking or etching 102 may be provided on the sleeve 93, as shown in FIG. 15, to indicate a limit for tightening of the bolt.

The drawings illustrate two different post assemblies 18A, 18B. The post assembly 18A shown in FIG. 16-23 is intended for use on a transfer object such as a bed frame, while the post assembly 18B shown in FIG. 24-31 is intended for use on a toilet bowl.

The post assembly 18A includes a vertically disposed post member 110 and a mounting bracket 112. The post member 110 may extend downwardly or upwardly from the bracket 112, though the drawings only show a downward orientation.

Figure 23:
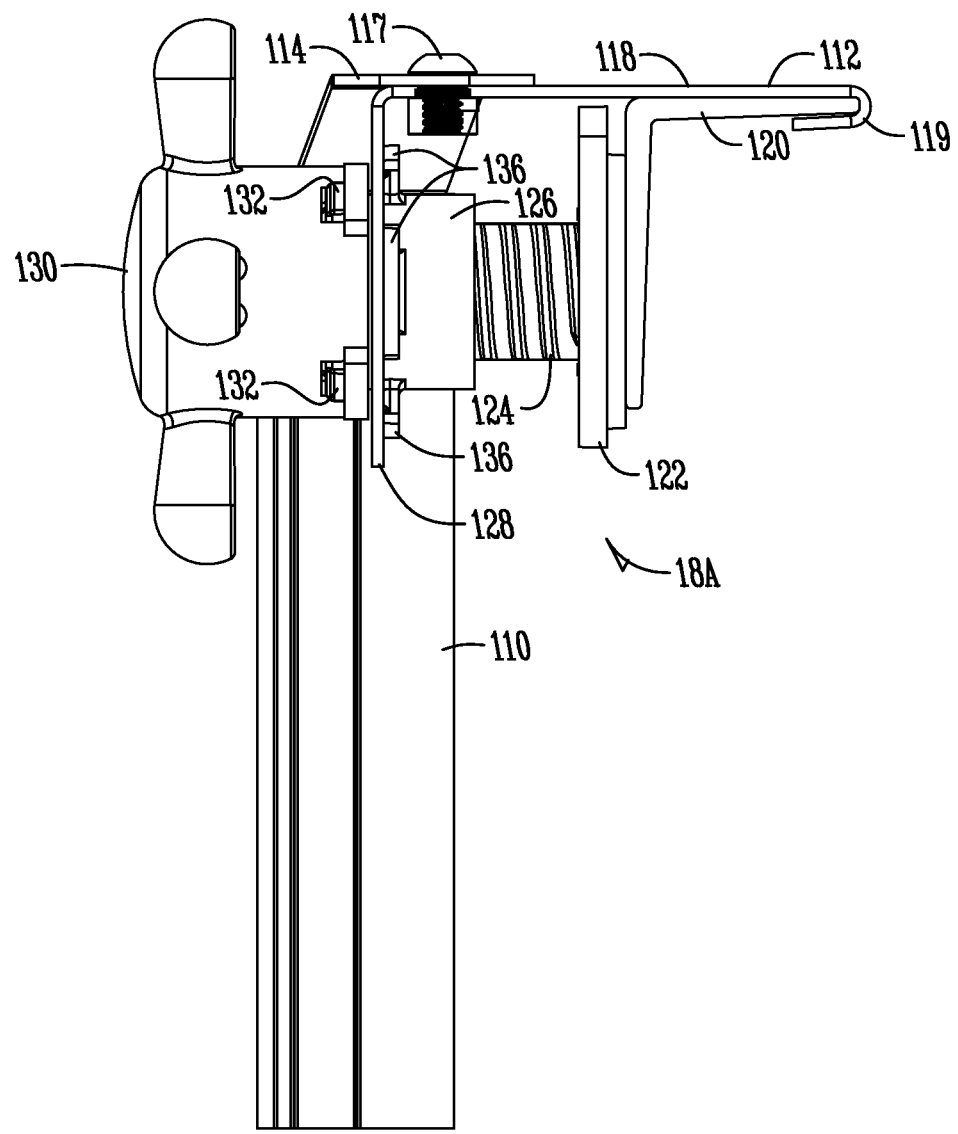
FIG. 23 is a side elevation view of the bed frame mounting bracket mounted on a bed frame.
Figure 24:
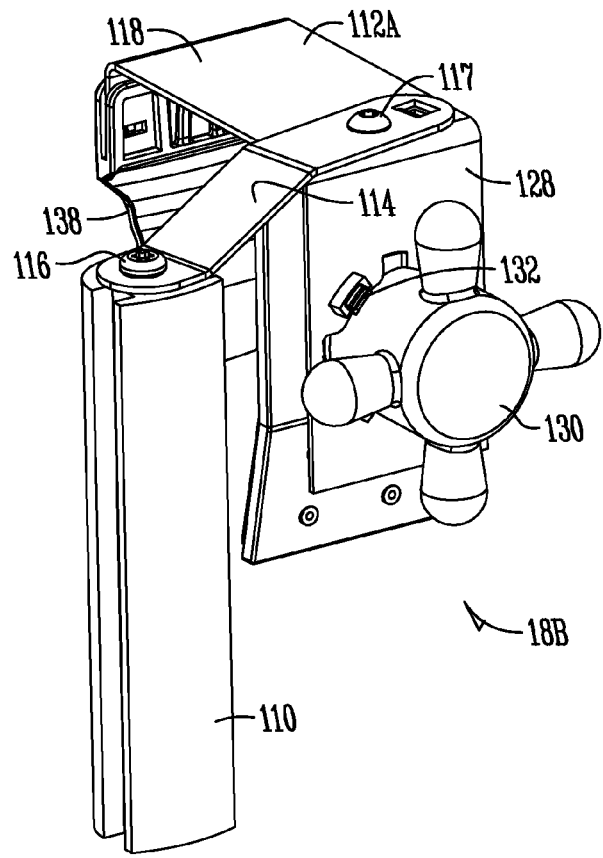
FIG. 24 is a perspective view of a toilet bowl mounting bracket, which is an alternative form of the post assembly of the wheelchair docking system according to the present invention.
Figure 25:
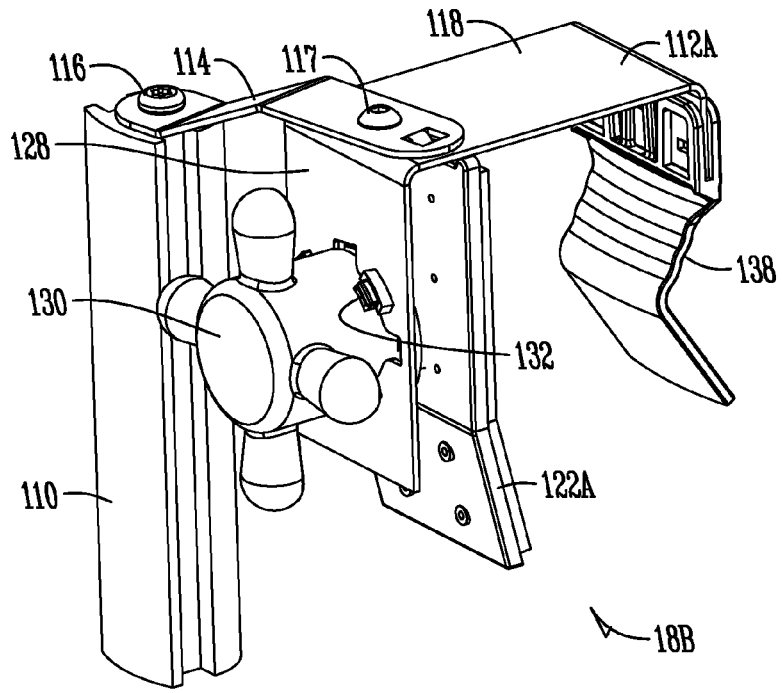
FIG. 25 is another perspective view of the toilet bowl mounting bracket.
Figure 26:
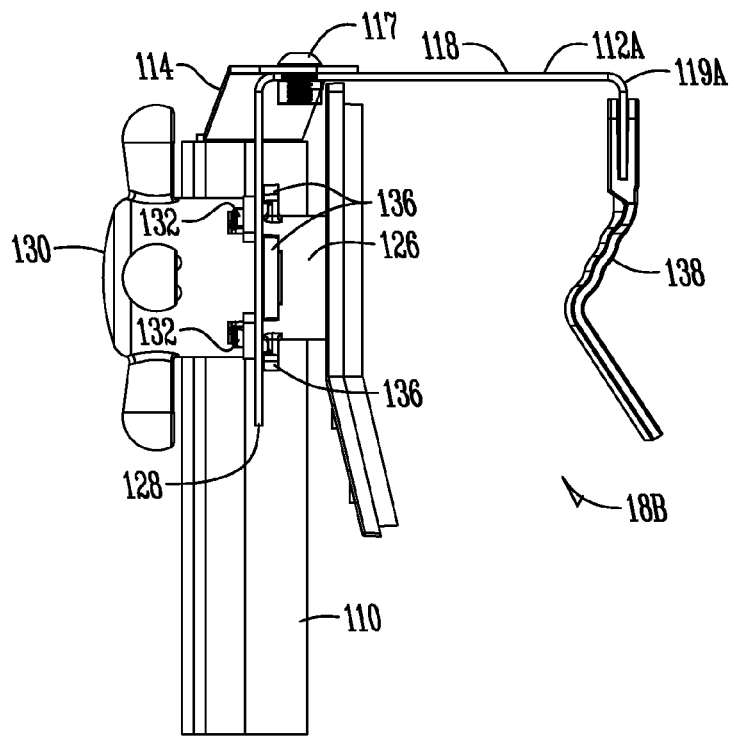
FIG. 26 is a side elevation view of the toilet bowl mounting bracket.
Figure 27:
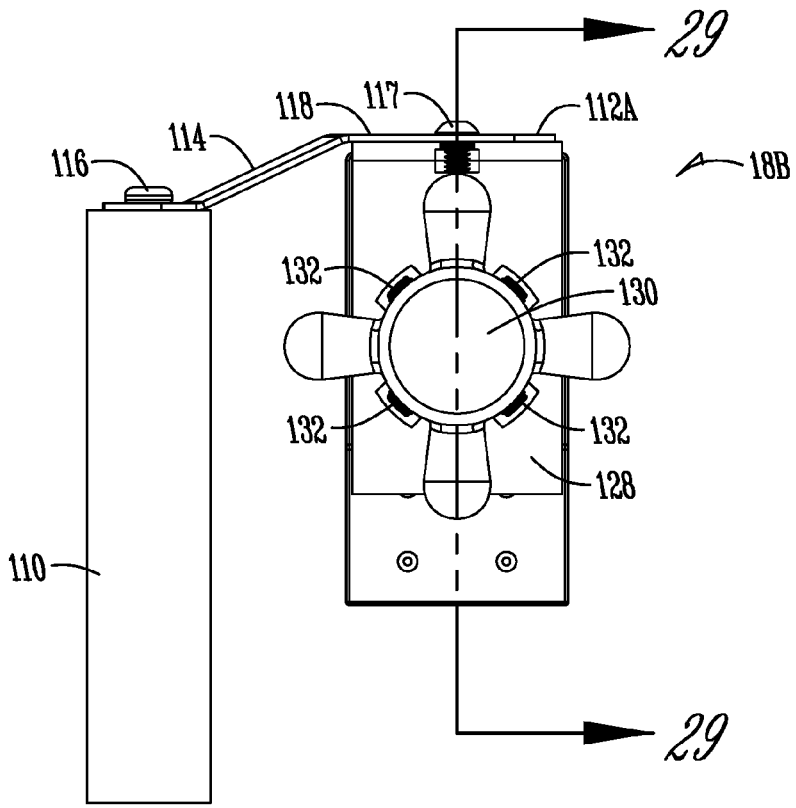
FIG. 27 is a front elevation view of the toilet bowl mounting bracket.
Figure 28:
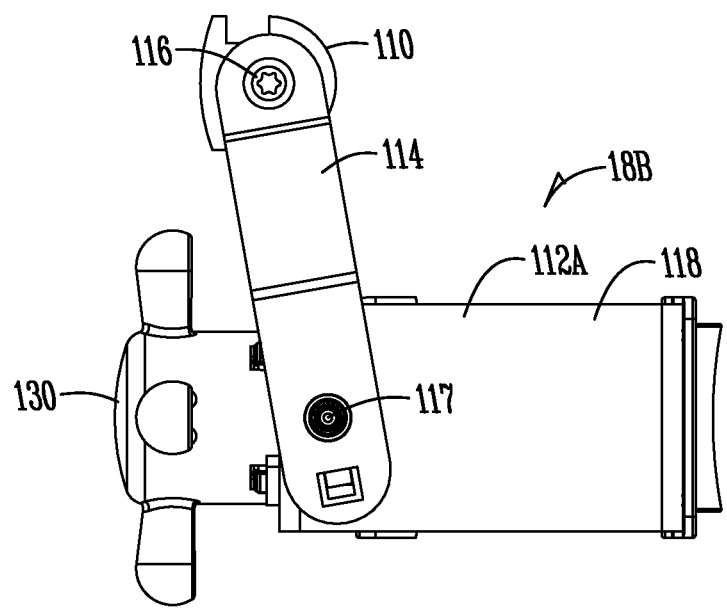
FIG. 28 is a top plan view of the toilet bowl mounting bracket.
Figure 29:
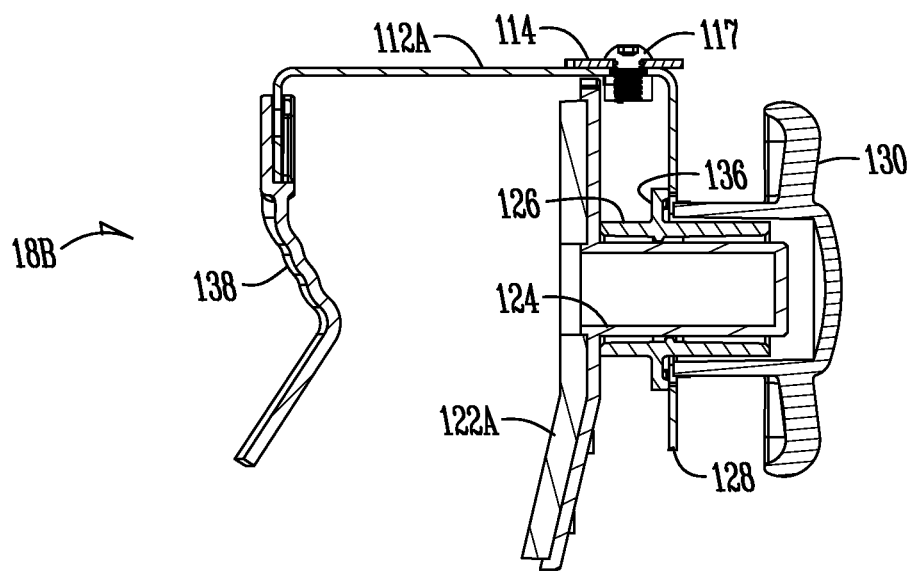
FIG. 29 is a sectional view taken along the lines 29-29 of FIG. 27.

The mounting bracket 112 is a generally L-shaped metal piece, with an arm 114 extending between the post member 110 and the mounting bracket 112. Screws 116, 117 secure the arm 114 to the post member 110 and to the mounting bracket 112, respectively. The horizontal leg of the mounting bracket 112 includes a U-shaped end 119 defining a channel to receive a bed frame 120, as shown in FIG. 23. A clamp secures the post member 18A to the bed frame 120. The clamp includes a clamp plate 122 on the end of a threaded shaft 124. The shaft 124 is threadably received within a sleeve 126, which in turn, is mounted in the vertical leg 128 of the mounting bracket 112 for rotation therein. A knob 130 snap fits on to the sleeve 126. More particularly, the sleeve 126 has a first set of radially extending tabs 134, which extend through a hole in the leg 128 of the mounting bracket 112 and are received in corresponding holes 134 in the knob 130. Thus, the knob 130 and the sleeve 126 rotate together. A second set of tabs 136 on the sleeve 126 reside on the inside of the leg 128 of the bracket 112, such that the leg 128 is sandwiched between the knob 130 and the tabs 136. When the knob 130 is rotated, the threaded sleeve 126 causes the clamp plate 122 to move inwardly or outwardly relative to the vertical leg 128 of the mounting bracket 112. The horizontal leg 118 precludes the clamp plate 122 from rotating.

Figure 31:
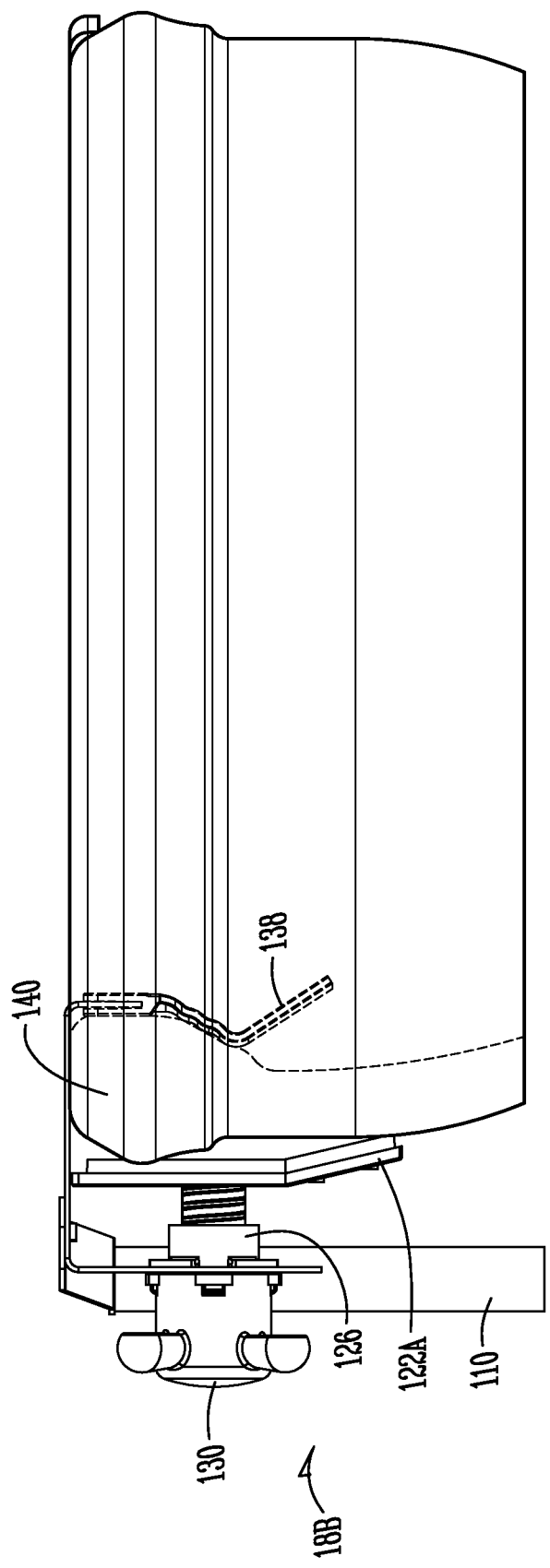
FIG. 31 is a view showing the toilet bowl mounting bracket mounted on a toilet bowl.
Figure 32A:
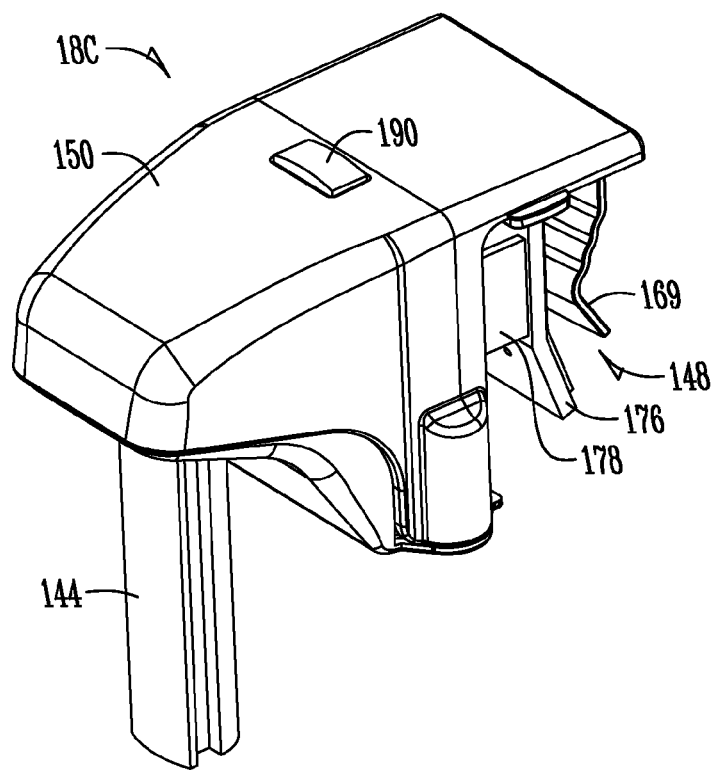
FIGS. 32A and 32B are perspective views of an alternative embodiment of a post assembly according to the present invention.
Figure 32B:
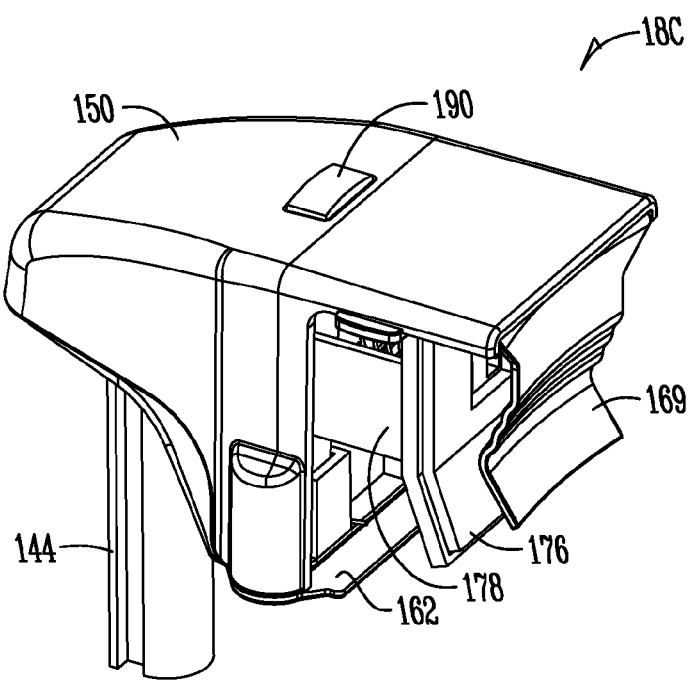
Figure 33:
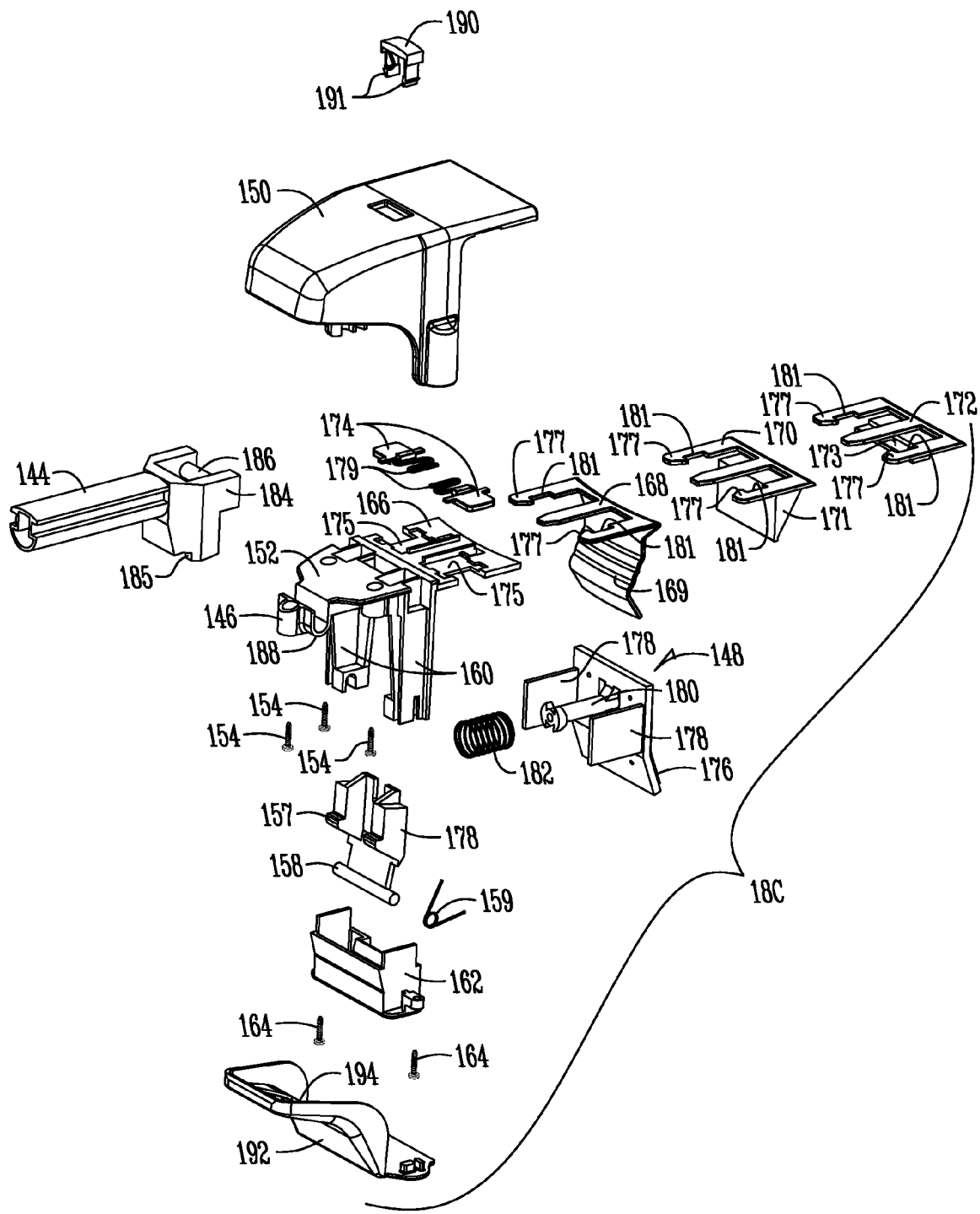
FIG. 33 is an exploded view of the post assembly embodiment shown in FIGS. 32A and 32B.
Figure 34:
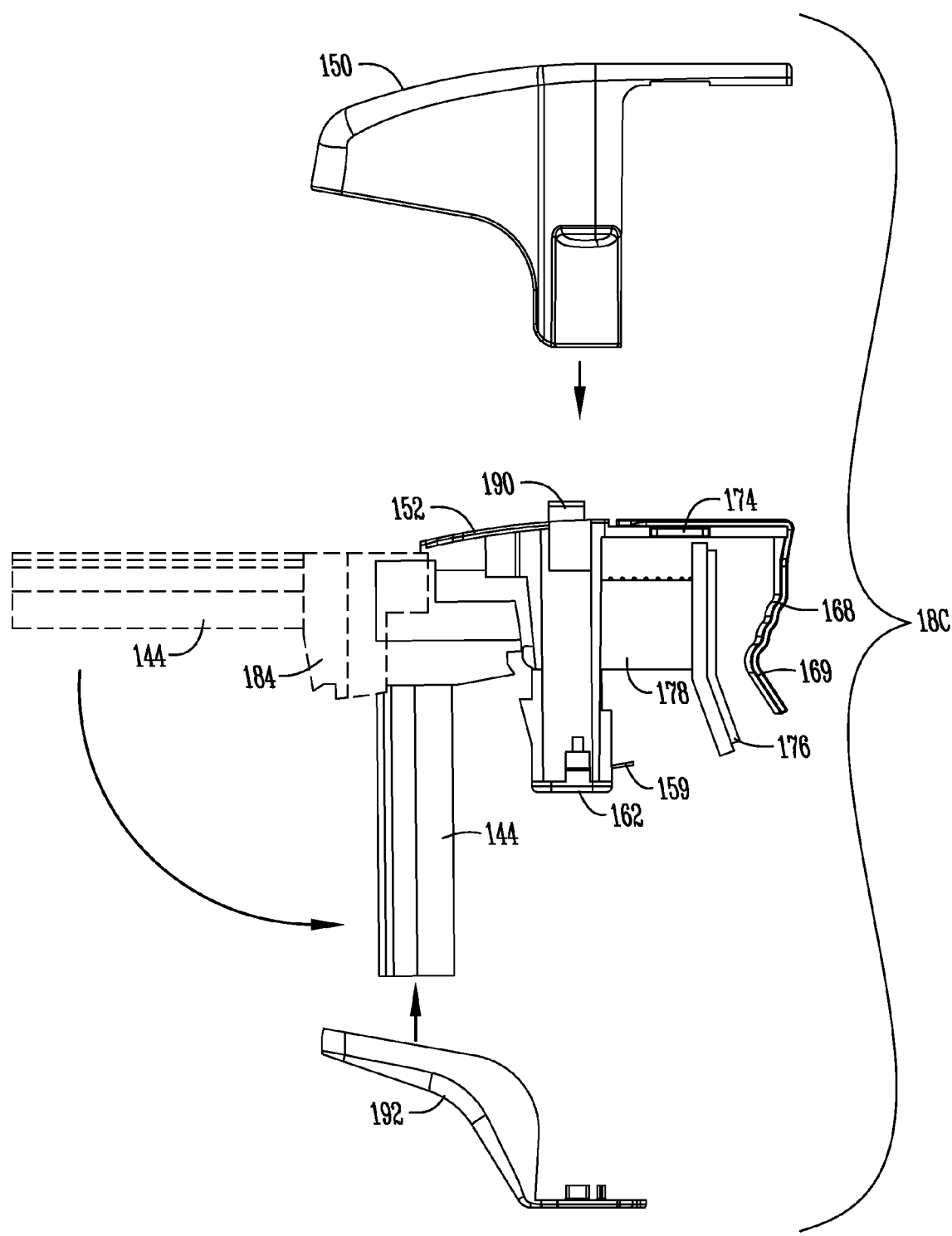
FIG. 34 is a partial exploded side elevation view of the post assembly of FIGS. 32A and 32B.
Figure 35:
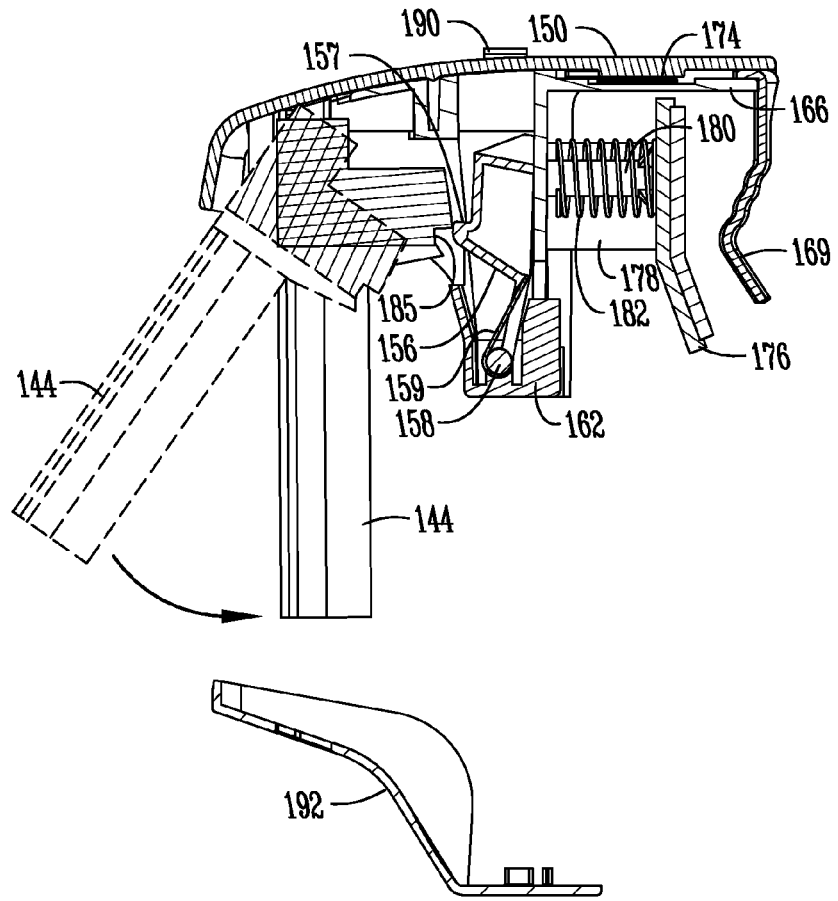
FIG. 35 is a sectional view of the post assembly shown in FIGS. 32A and 32B.
Figure 36:
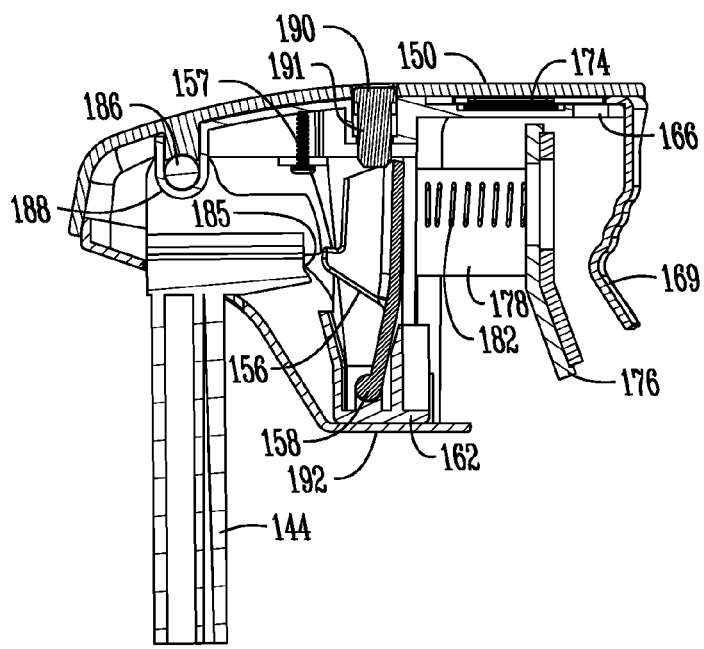
FIG. 36 is a sectional view of the post assembly of FIGS. 32A and 32B showing the release button for the clamp in an actuated, depressed position.

The post member 18B is similar in the construction to the post member 18A, with similar components having the same reference numerals. The mounting bracket 112A has a horizontal leg 118 terminating in a downwardly turned lip 119A. The clamp plate 122A is elongated, as compared to the clamp plate 122 of the post assembly 18A, and slightly curved, as to accommodate the curvature on the exterior of a standard toilet bowl. An inner clamp plate 138 is provided on the lip 119A and is contoured so as to accommodate the inner surface of the toilet bowl 140, as seen in FIG. 31. The shaft 124, sleeve 126, and the knob 130 of the post assembly 18B function the same as described in the above for the post assembly 18A.

Figure 22:
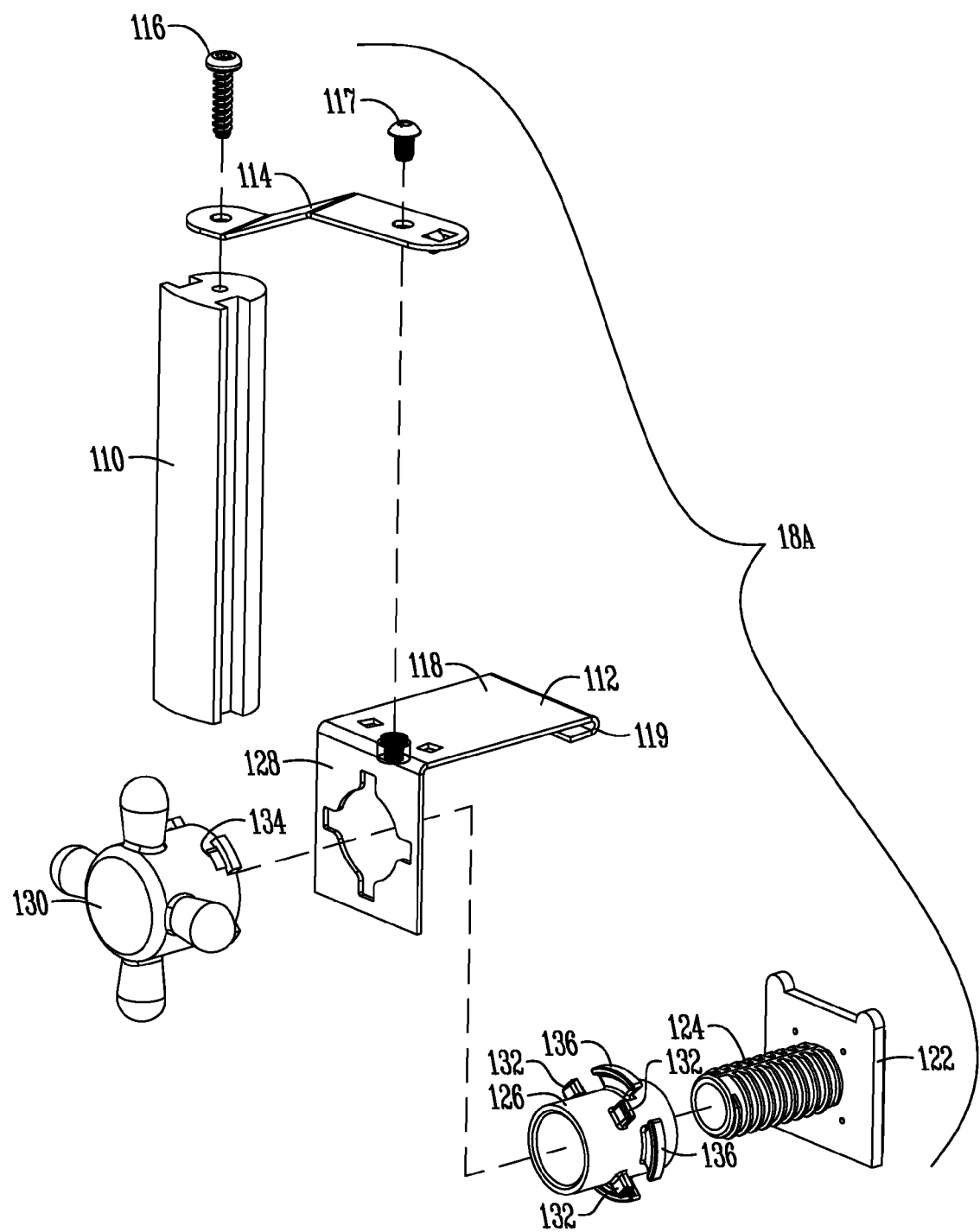
FIG. 22 is an exploded view of the bed frame mounting bracket.
Figure 30:
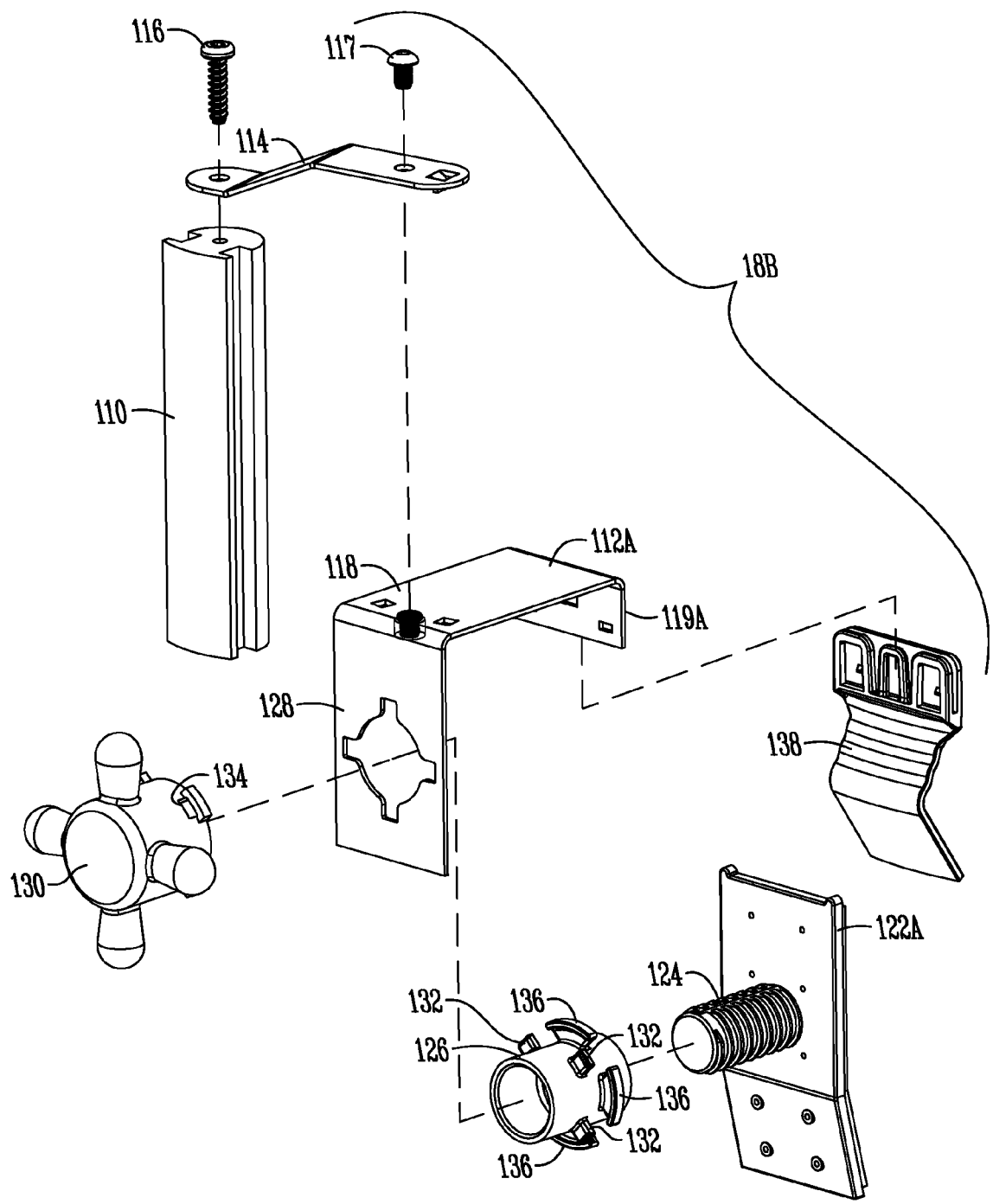
FIG. 30 is an exploded perspective view of the toilet bowl mounting bracket.

It is contemplated that the latch assembly 16 can be mounted either upon the wheelchair 12 using the clamp 84 or alternatively, upon the transfer or fixed object using an appropriate mounting member, such as a clamp or other structure. When the latch assembly 16 is mounted on the transfer or fixed object, the post member 110 is mounted on the wheelchair 12 using the clamp 84. More particularly, the post member 110 has a T-shaped contour, as best seen in FIGS. 22 and 30, similar to the base 80 of the wall bracket 78, such that the post member 110 can be clamped between the clamp arms 91, 93 of the clamp 84, while the clamp arms 86, 87 are clamped to the wheelchair frame. This alternative arrangement operates in the same manner as the preferred arrangement described above, with the post member 110 forcing the second arm 22 open simply by engaging a curved or sloped ends 54, 56 of the arms 20, 22 for receipt of the post member into the opening 58 for retention when the arm 22 automatically closes. Release of the post member 110 is also accomplished in the same manner as described above, with the lock mechanism 40 engaged to temporarily hold the second arm 22 in the open position for release of the post member 110, or alternatively, manually gripping the wings 65 to open the latch assembly 16 for release of the post member 110 as the wheelchair 12 is rolled away from the transfer object 14 or fixed object.

FIGS. 32-35 show another alternative embodiment of a post assembly 18C for use with the latch assembly 16, in accordance with the present invention. The assembly 18C has three primary components, the post member 144, the mounting bracket 146, and the clamp 148.

More particularly, the mounting bracket 146 includes an upper housing 150, to which an upper body or frame 152 is secured by screws 154. A pressure plate 156 has an axle 158 received in slots in the lower end of a pair of spaced apart legs 160 on the body 152. A torsion spring 159 is mounted on one end of the axle 158. A lower body 162 of the mounting bracket 146 is secured to the upper body 150 by screws 164 so as to retain the pressure plate 156 between the upper and lower bodies 152, 162. The pressure plate 156 is pivotal about the axis of the axle 158.

The upper body or frame 152 includes a horizontal arm 166 to which plates 168, 170 and 172 can be interchangeably mounted by use of a pair of spring buttons 174. The buttons 174 are slidably received in tracks or channels 175 formed on the arm 166 of the body 172. When one of the plates 168, 170 or 172 are slid into position between the housing 150 and the arm 166, the ends of the prongs 170 on the plates force the buttons 174 together, against the bias of the springs 179, until the notches 181 on the prongs 177 are aligned with the tracks 175. Then, the springs 179 on the buttons 174 force the buttons outwardly into the notches 181 so as to secure the plates 168, 170 or 172 to the body 152. If it is desired to exchange one of the plates 168, 170 or 172 for another, the mounted plate is gently pulled away from the housing 150 and body 152, such that the prongs 177 push the buttons 174 inwardly, thereby releasing the prongs and the plate from the body 152. The plate 168 includes a lower leg 169, similar to the leg or inner clamp plate 138 for positioning on the inside of a toilet bowl rim. The plate 170 includes a lower leg 171 to mount on the inside of a bed rail or frame. The plate 172 includes a lip 173, similar to the lip 119, for receiving an angle iron bed frame.

An outer clamp plate 176, similar to clamp plate 122 and 122A is mounted to the upper body 152 via spaced apart arms 178 which are received in slots (not shown) on the legs 160 of the body 152. The clamp plate 176 includes a horizontal rod 180 upon which a compression spring 182 is mounted. The spring 182 resides between the back of the clamp plate 176 and the pressure plate 178.

The upper end of the post member 144 is secured to, or formed with, a C-shaped collar 184. An axle 186 extends between the legs of the collar 144. The axle is rotatably received within a channel 188 formed on the upper body 152 of the mounting bracket 146, such that the post member 144 is pivotal from a substantially horizontal position, as shown in broken lines in FIG. 34, to the vertical position shown in solid lines in FIG. 34. When the post member 144 is pivoted from the raised horizontal position to the lowered vertical position, the collar 144 engages the pressure plate 156, which in turn pivots about the axle 158 so as to force the outer clamp plate 176 toward the respective clamp plate 176, 170, or 172. When the post member 144 moves over-center approximately 2°, a nose 157 on the pressure plate is matingly received in a notch 185 on the collar 184, so as to lock the clamp 148 in a tightened position on the toilet, bed, or other object. Thus, the post member 144 functions as a lever clamp to secure the post assembly 18C onto a transfer object, such as a toilet or bed.

As discussed above, the post assembly 18C can be inverted such that the post member 144 extends upwardly. In this orientation, a dust cover 192 fits onto the body 162 so as to cover the end of the mounting bracket 146. The dust cover 192 has an opening 194 through which the post member 144 extends.

Thus, the post assembly 18C can be quickly and easily mounted to a transfer object, such as a toilet or bed, simply by moving the post member 144 from the raised horizontal position, wherein the clamp 148 is de-actuated, to the lowered vertical position wherein the clamp 148 is actuated. To release the post assembly 18C, a button 190 on the top of the housing 150 is depressed, while simultaneously pushing the post member 144 over-center approximately 10°, such that the legs 191 drop behind the pressure plate 156. This drop down position of the button 190 holds the pressure plate 156 such that the nose 157 is disengaged from the notch 185 of the collar 184, whereby the post member 144 is free to be rotated upwardly. Chamfers on the left legs 191 of the button 190 then allow the button to pop up, such that the clamp 148 is loosened, so that the post assembly 118C can be removed from the toilet or bed.

The invention has been shown and described above with the preferred embodiments, and it is understood that many modifications, substitutions, and additions may be made which are within the intended spirit and scope of the invention. From the foregoing, it can be seen that the present invention accomplishes at least all of its stated objectives.

What is claimed is:

1. A wheelchair docking system for preventing accidental movement of a wheelchair away from an object, comprising:
   a latch assembly;
   a post assembly;
   one of the latch and post assemblies being mountable on a front portion of the wheelchair and the other of the latch and post assemblies being mounted on the object;
   the latch assembly being moveable between an open position to receive and release the post assembly and a closed position to retain the post assembly;
   the latch assembly being biased to the closed position; and
   a lock on the latch assembly wherein the lock is moveable between a locked position to hold the latch assembly in the open position and an unlocked position to allow the latch assembly to move to the closed position.

2. The wheelchair docking system of claim 1 wherein the latch assembly includes first and second arms, with the second arm being pivotal relative to the first arm.

3. The wheelchair docking system of claim 2 wherein the latch assembly includes a mounting bracket for securing the latch assembly to the wheelchair or to the object.

4. The wheelchair docking system of claim 3 wherein the latch assembly includes an indexing tooth to maintain the first arm in a selected angular position relative to the mounting bracket.

5. The wheelchair docking system of claim 2 wherein the second arm includes a finger for pulling the second arm away front the first arm so as to open the latch assembly.

6. The wheelchair docking system of claim 1 wherein the post assembly overcomes the bias of the latch assembly so as to open the latch when the post assembly moves into the latch assembly.

7. The wheelchair docking system of claim 1 wherein the post assembly includes an elongated post member and a mounting bracket for securing the post assembly to the object or to the wheelchair.

8. The wheelchair docking system of claim 7 wherein the mounting bracket includes a clamp and a knob to adjust the clamp.

9. The wheelchair docking system of claim 7 wherein the lock has a leg engageable by the post member to assure that the latch assembly moves to the closed position after receiving the post member.

10. The wheelchair docking system of claim 1 wherein the latch assembly automatically moves from the closed position to the open position when receiving the post assembly.

11. A wheelchair docking system for preventing accidental movement of a wheelchair away from an object, comprising:

a latch assembly;

a post assembly;

one of the latch and post assemblies being mountable on a front portion of the wheelchair and the other of the latch and post assemblies being mountable on the object;

the latch assembly being moveable between an open position to receive and release the post assembly and a closed position to retain the post assembly;

the latch assembly being biased to the closed position; and the latch assembly including first and second arms, with the second arm being pivotal relative to the first arm; and a finger extending from the second arm for pulling the second arm to move the latch assembly from the closed position to the open position.

12. The wheelchair docking system of claim 11 wherein the second arm and the finger are not co-planar.

13. The wheelchair docking system of claim 11 further comprising a lock on the latch assembly to hold the latch assembly in the open position.

14. The wheelchair docking system of claim 13 wherein the lock is moveable between a locked position to hold the arms in the open position and an unlocked position to allow the arms to move to the closed position.

15. The wheelchair docking system of claim 13 wherein the lock has a leg engageable by the post member to assure that the latch assembly moves to the closed position after receiving the post member.

16. The wheelchair docking system of claim 11 wherein the latch assembly includes a mounting bracket for securing the latch assembly to one of the wheelchair and the object.

17. The wheelchair docking system of claim 11 wherein the latch assembly includes an indexing tooth to maintain the second arm in a selected angular position relative to the mounting bracket.

18. The wheelchair docking system of claim 11 wherein, the post assembly includes an elongated post member and a mounting bracket for securing the post assembly to one of the object and the wheelchair.

19. The wheelchair docking system of claim 11 wherein the post assembly overcomes the bias of the latch assembly when moving into retention.

20. The wheelchair docking system of claim 11 wherein the latch assembly automatically moves from the closed position to the open position when receiving the post assembly.

21. A wheelchair docking system for preventing movement of a wheelchair away from an object, comprising:

a latch assembly;

a post assembly including a post member and a clamp;

one of the latch and post assemblies being mountable on the wheelchair and the other of the latch and post assemblies being mountable on the object;

the latch assembly being moveable between an open position to receive and release the post member and a closed position to retain the post member; and the post member being moveable between first and second positions to loosen and tighten the clamp.

22. The wheelchair docking system of claim 21 wherein the post assembly has interchangeable clamp legs for mounting the post assembly to different objects.

23. The wheelchair docking system of claim 21 wherein the post member locks the clamp in a tightened position when the post member is moved from the first position to the second position.

24. The wheelchair docking system of claim 23 further comprising a release button on the post assembly to unlock the clamp.

* * * * *